(12) United States Patent
Hiwatashi

(10) Patent No.: US 12,623,656 B2
(45) Date of Patent: May 12, 2026

(54) SIMULATION SYSTEM FOR VEHICLE

(71) Applicant: SUBARU CORPORATION, Tokyo (JP)

(72) Inventor: Yutaka Hiwatashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 18/869,648

(22) PCT Filed: Apr. 10, 2023

(86) PCT No.: PCT/JP2023/014577
§ 371 (c)(1),
(2) Date: Nov. 26, 2024

(87) PCT Pub. No.: WO2024/214150
PCT Pub. Date: Oct. 17, 2024

(65) Prior Publication Data
US 2025/0360919 A1 Nov. 27, 2025

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0956* (2013.01);
(Continued)

(58) Field of Classification Search
CPC .. B60W 30/09; B60W 10/18; B60W 30/0956; B60W 50/14; B60W 2050/0008;
(Continued)

(56) References Cited

U.S. PATENT DOCUMENTS

| | | | |
|---|---|---|---|
| 11,644,842 B1* | 5/2023 | Phan | G06V 20/56 701/23 |
| 2018/0253106 A1 | 9/2018 | Inui et al. | |

FOREIGN PATENT DOCUMENTS

JP 2018-144526 A 9/2018

OTHER PUBLICATIONS

International Search Report (with English translation) and Written Opinion dated May 30, 2023, from corresponding International Application No. PCT/JP2023/014577 , 8 pages.

* cited by examiner

*Primary Examiner* — Michael D Lang
(74) *Attorney, Agent, or Firm* — Rimon P.C.

(57) ABSTRACT

A control operation representer of a simulation system for a vehicle represents control operation of a travel controller in accordance with vehicle external detection information outputted by a vehicle external detection controller based on a captured vehicle external image. A vehicle behavior calculator calculates behavior of the vehicle in accordance with the control operation. A vehicle external image generator generates a vehicle external image in accordance with the behavior and displays the vehicle external image on a display member. An imaging member captures the vehicle external image displayed, and outputs a captured vehicle external image to the vehicle external detection controller. The vehicle external detection controller operates in a closed loop including these. The travel controller operates, outside the closed loop, in accordance with information generated by the vehicle external detection controller or information equivalent to the information generated by the vehicle external detection controller.

15 Claims, 13 Drawing Sheets

(51) Int. Cl.
    *B60W 30/095*     (2012.01)
    *B60W 50/00*     (2006.01)
    *B60W 50/14*     (2020.01)
    *G06V 20/58*     (2022.01)

(52) U.S. Cl.
    CPC ............. *B60W 50/14* (2013.01); *G06V 20/58*
      (2022.01); *B60W 2050/0008* (2013.01); *B60W*
        *2050/146* (2013.01); *B60W 2420/403*
          (2013.01)

(58) Field of Classification Search
    CPC ...... B60W 2050/146; B60W 2420/403; G06V
          20/58
    See application file for complete search history.

[ FIG. 1 ]
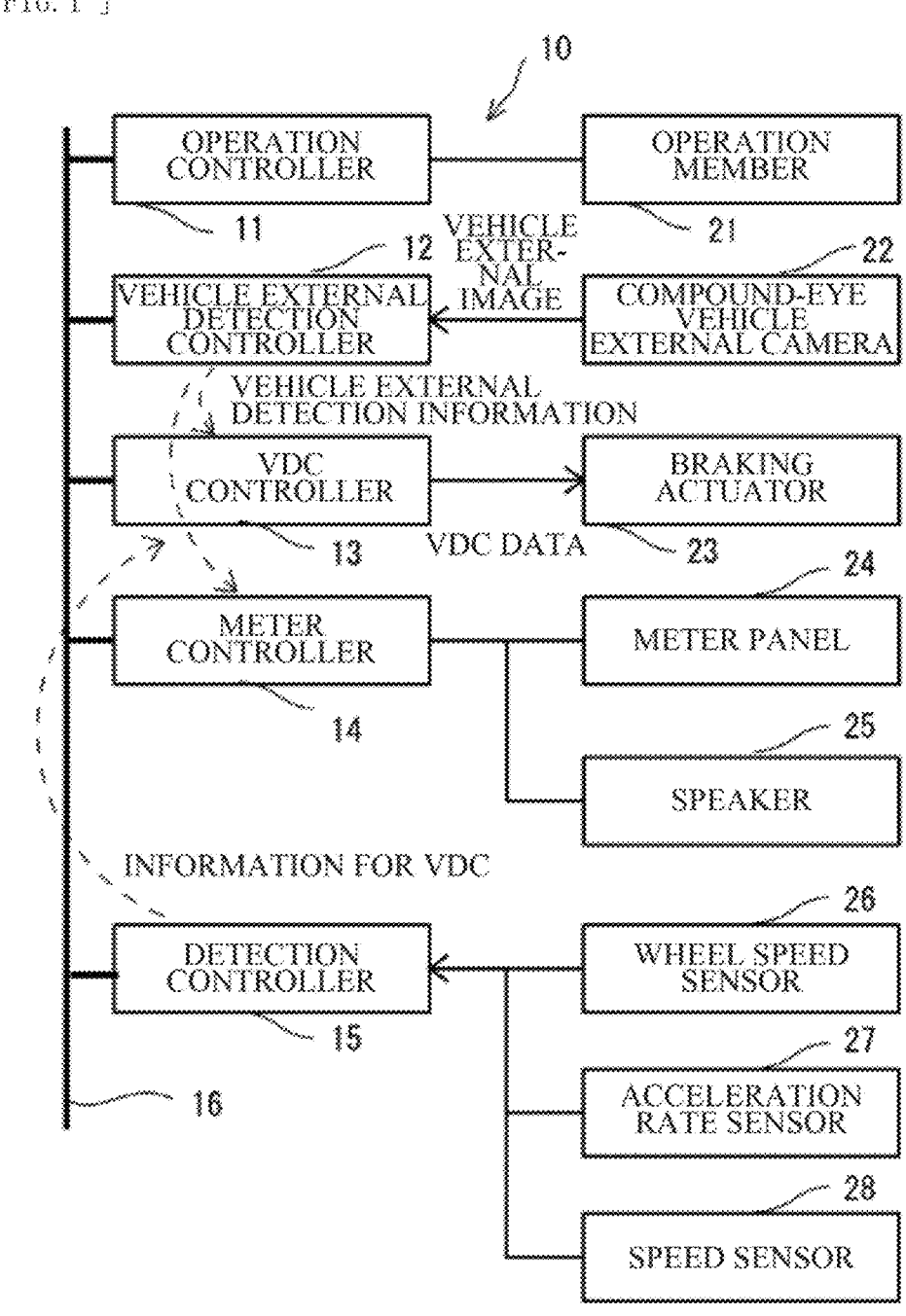

[ FIG. 2 ]
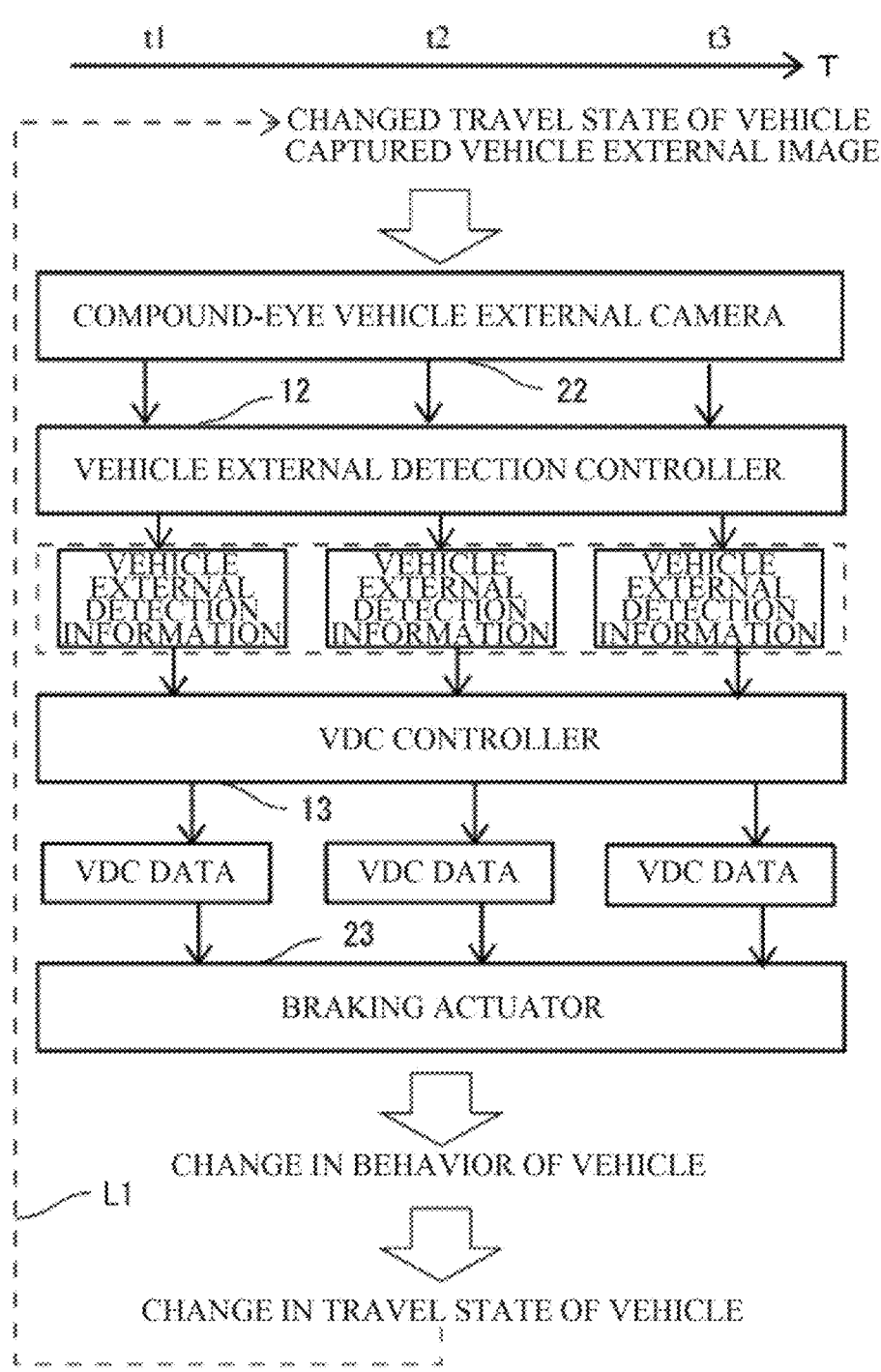

[ FIG. 3 ]
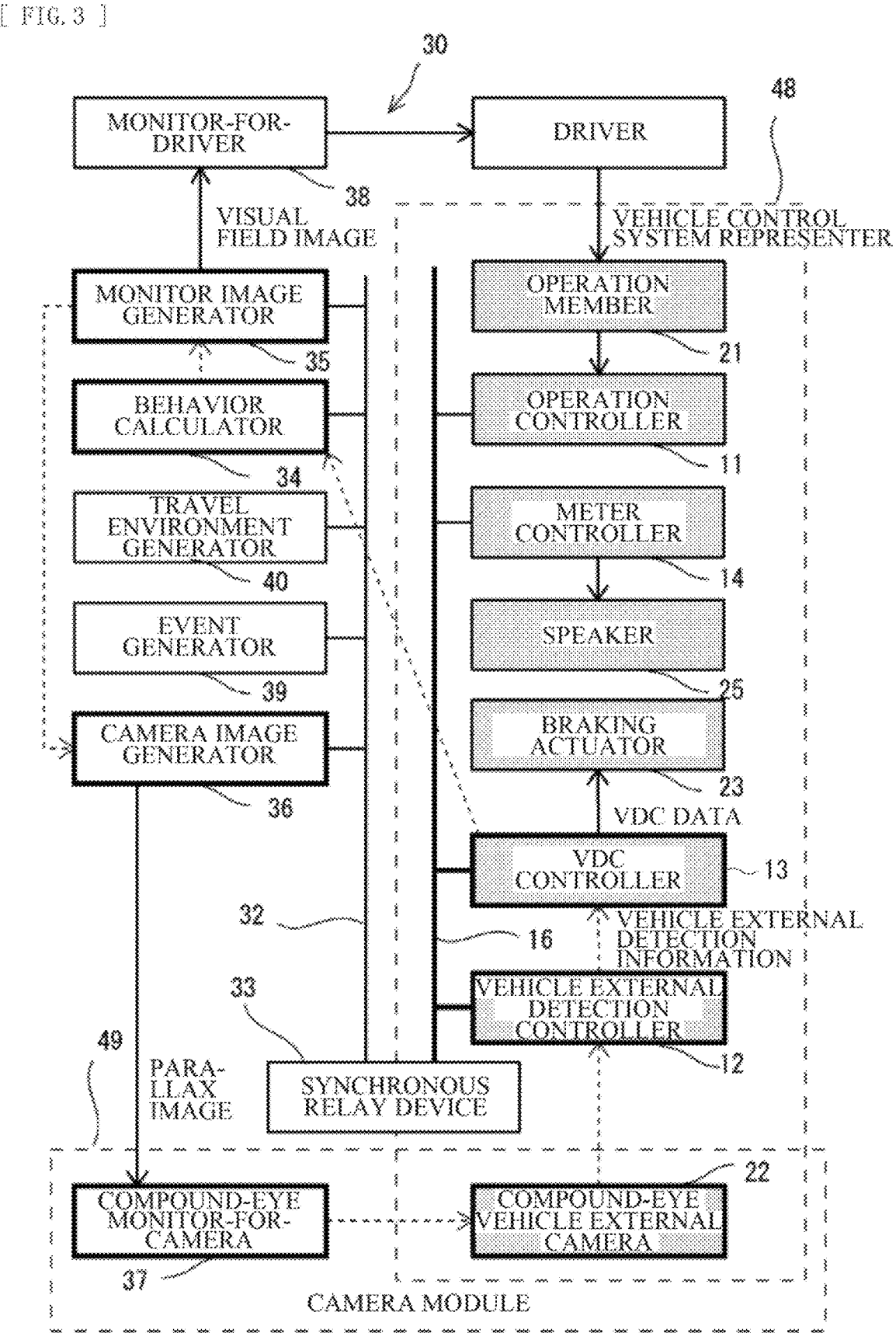

[ FIG. 4 ]
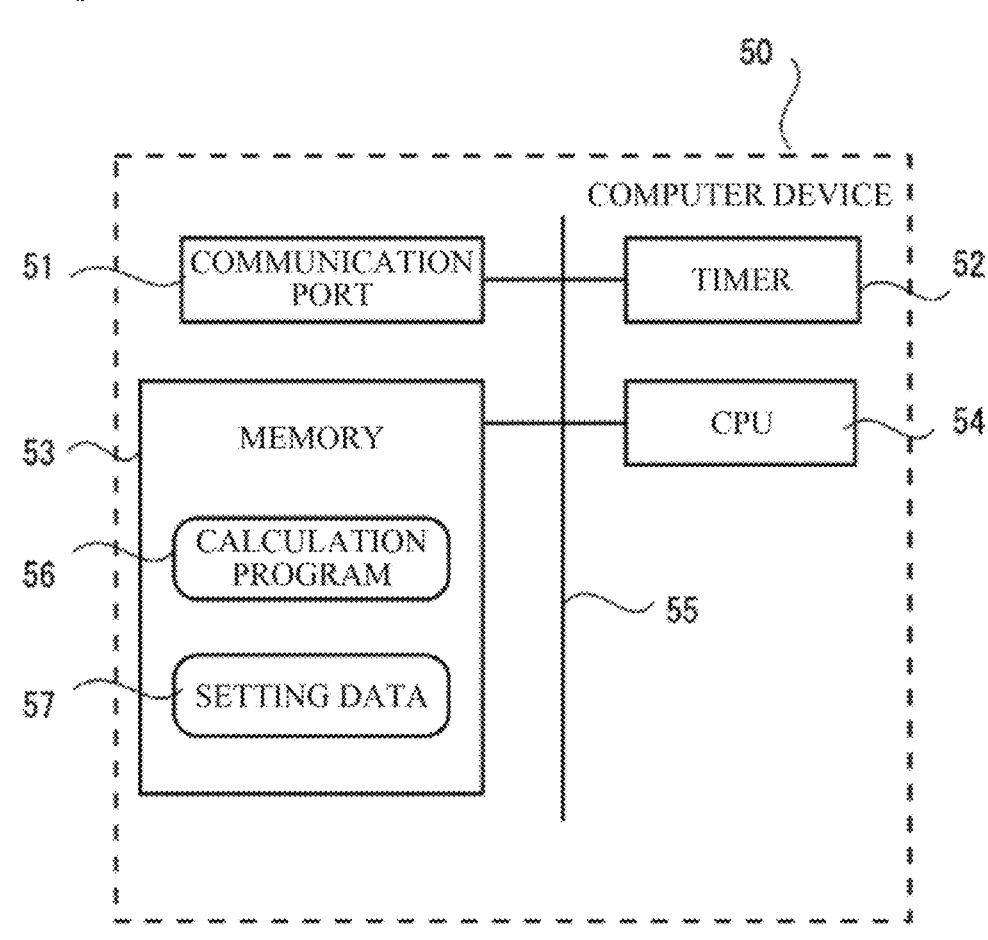

[ FIG. 5 ]
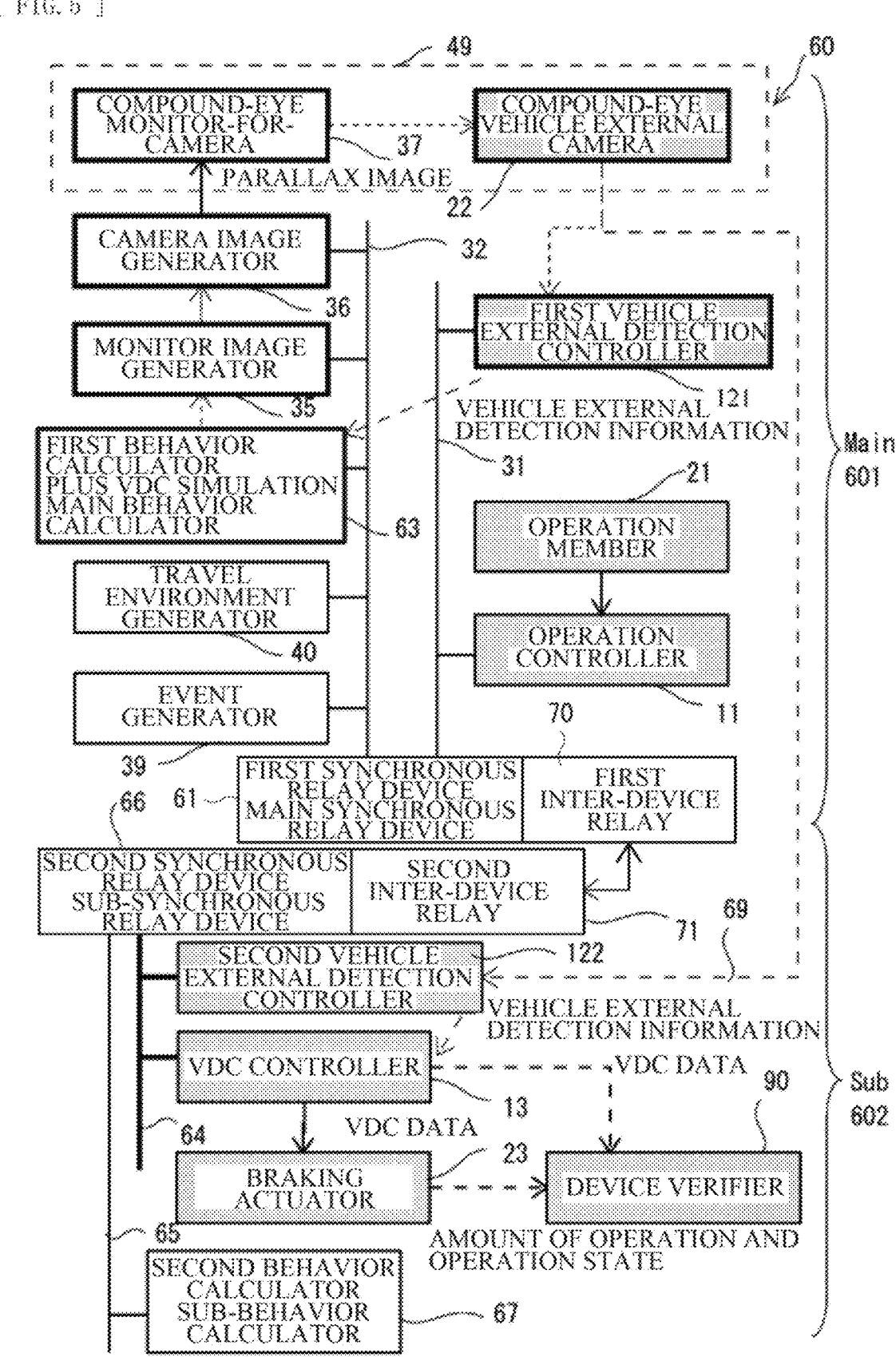

[FIG. 6]

[ FIG. 7 ]
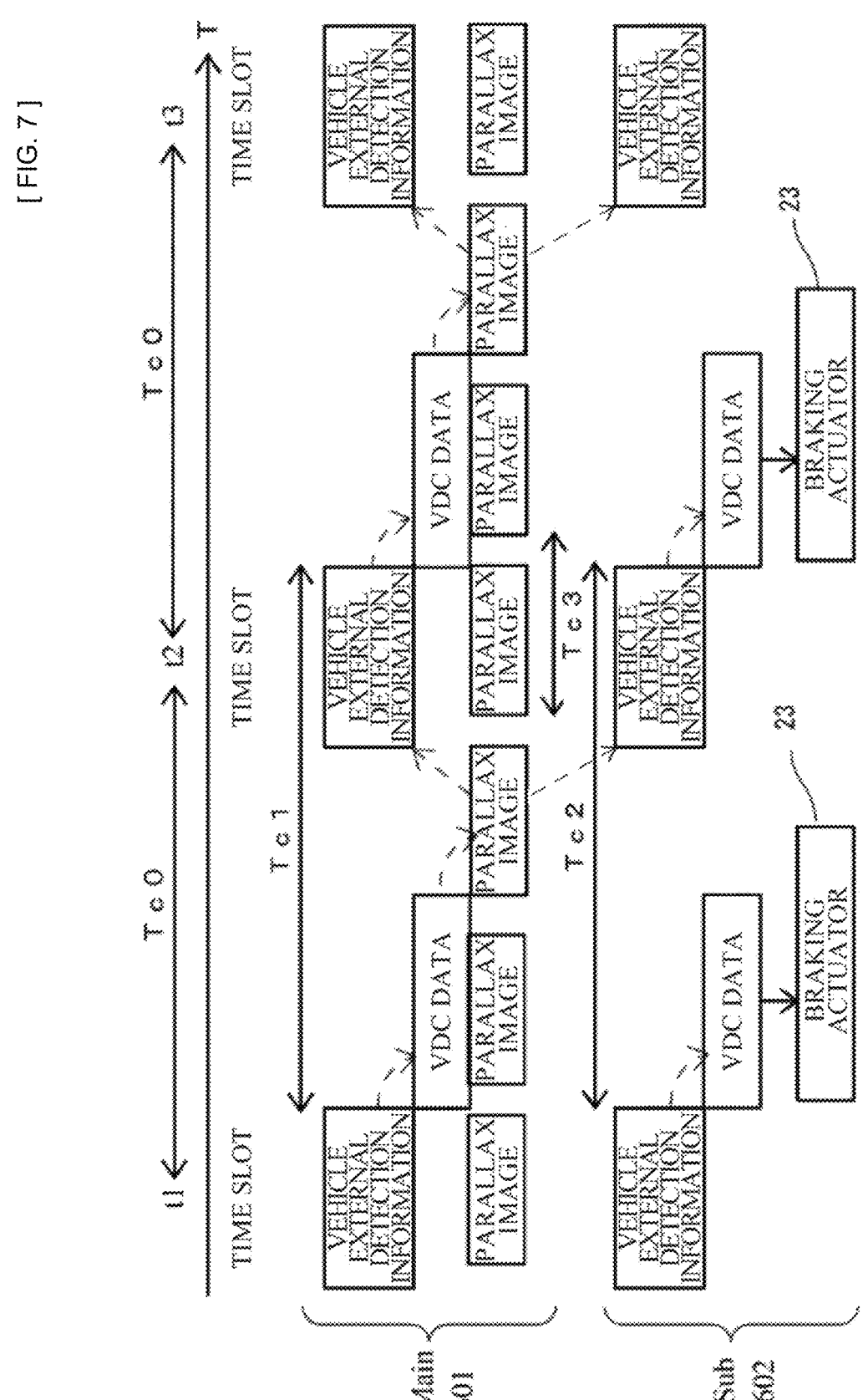

[ FIG. 8 ]

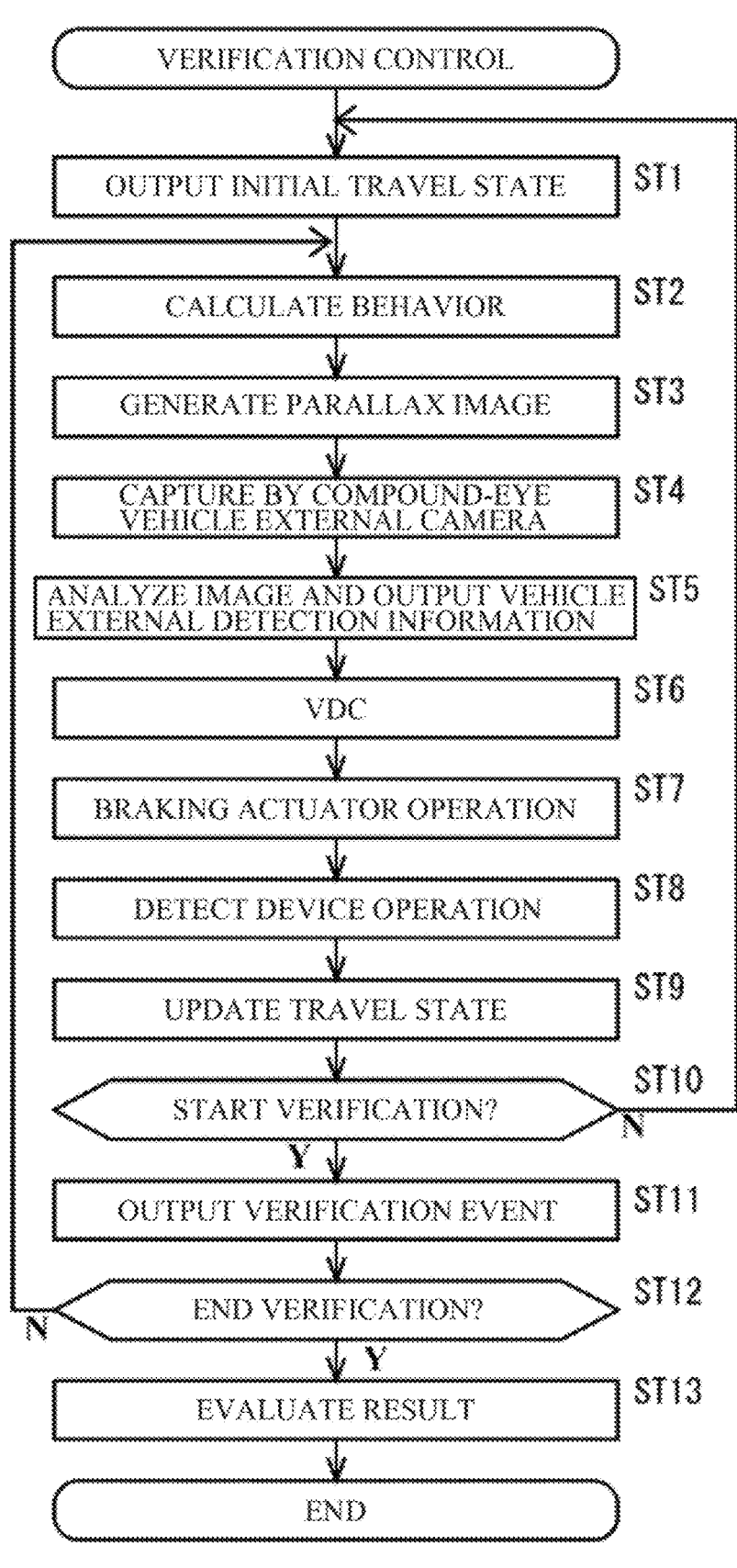

VERIFICATION CONTROL

OUTPUT INITIAL TRAVEL STATE — ST1

CALCULATE BEHAVIOR — ST2

GENERATE PARALLAX IMAGE — ST3

CAPTURE BY COMPOUND-EYE VEHICLE EXTERNAL CAMERA — ST4

ANALYZE IMAGE AND OUTPUT VEHICLE EXTERNAL DETECTION INFORMATION — ST5

VDC — ST6

BRAKING ACTUATOR OPERATION — ST7

DETECT DEVICE OPERATION — ST8

UPDATE TRAVEL STATE — ST9

START VERIFICATION? — ST10
N

Y

OUTPUT VERIFICATION EVENT — ST11

END VERIFICATION? — ST12
N

Y

EVALUATE RESULT — ST13

END

[ FIG. 9 ]
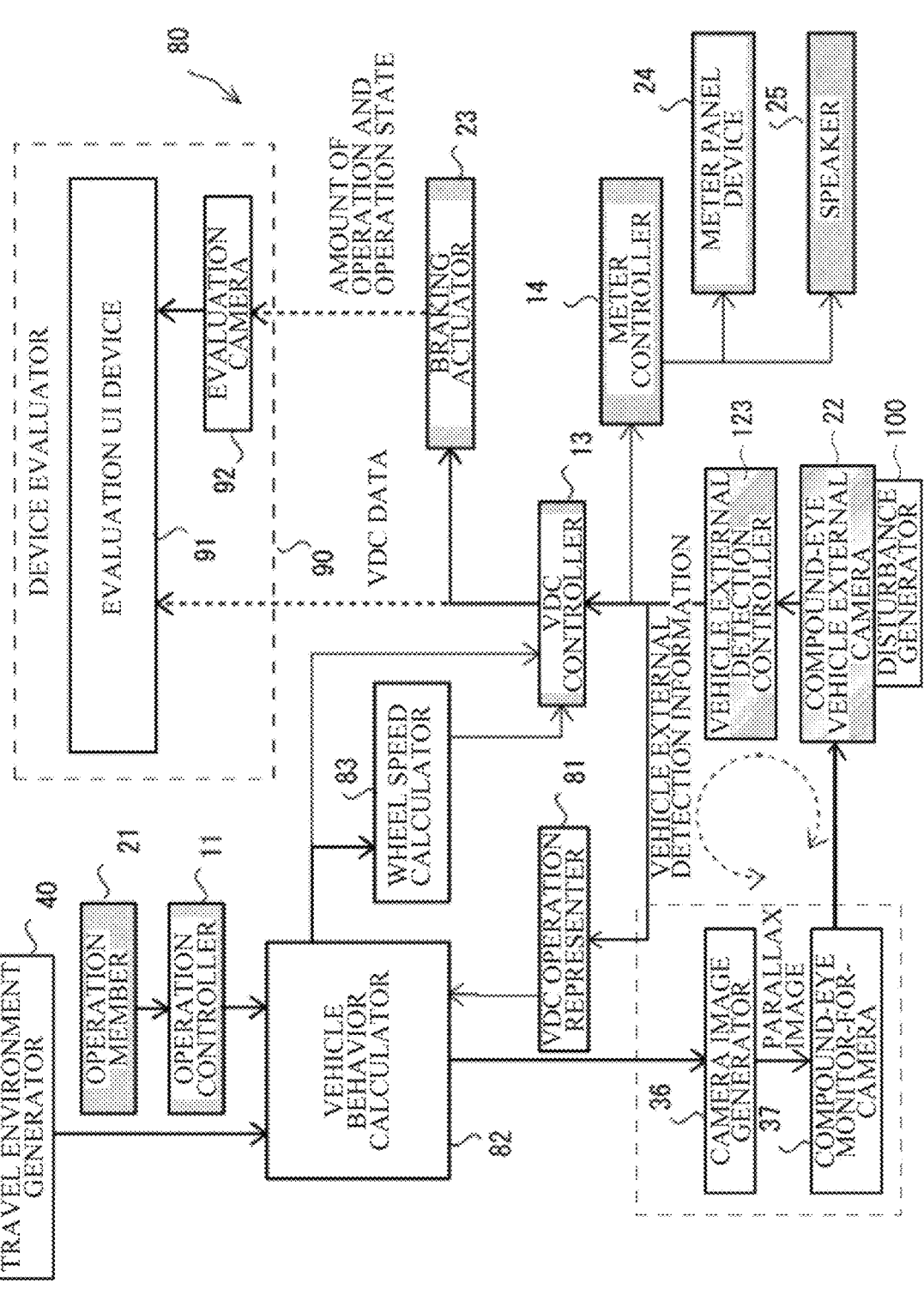

[ FIG. 10 ]
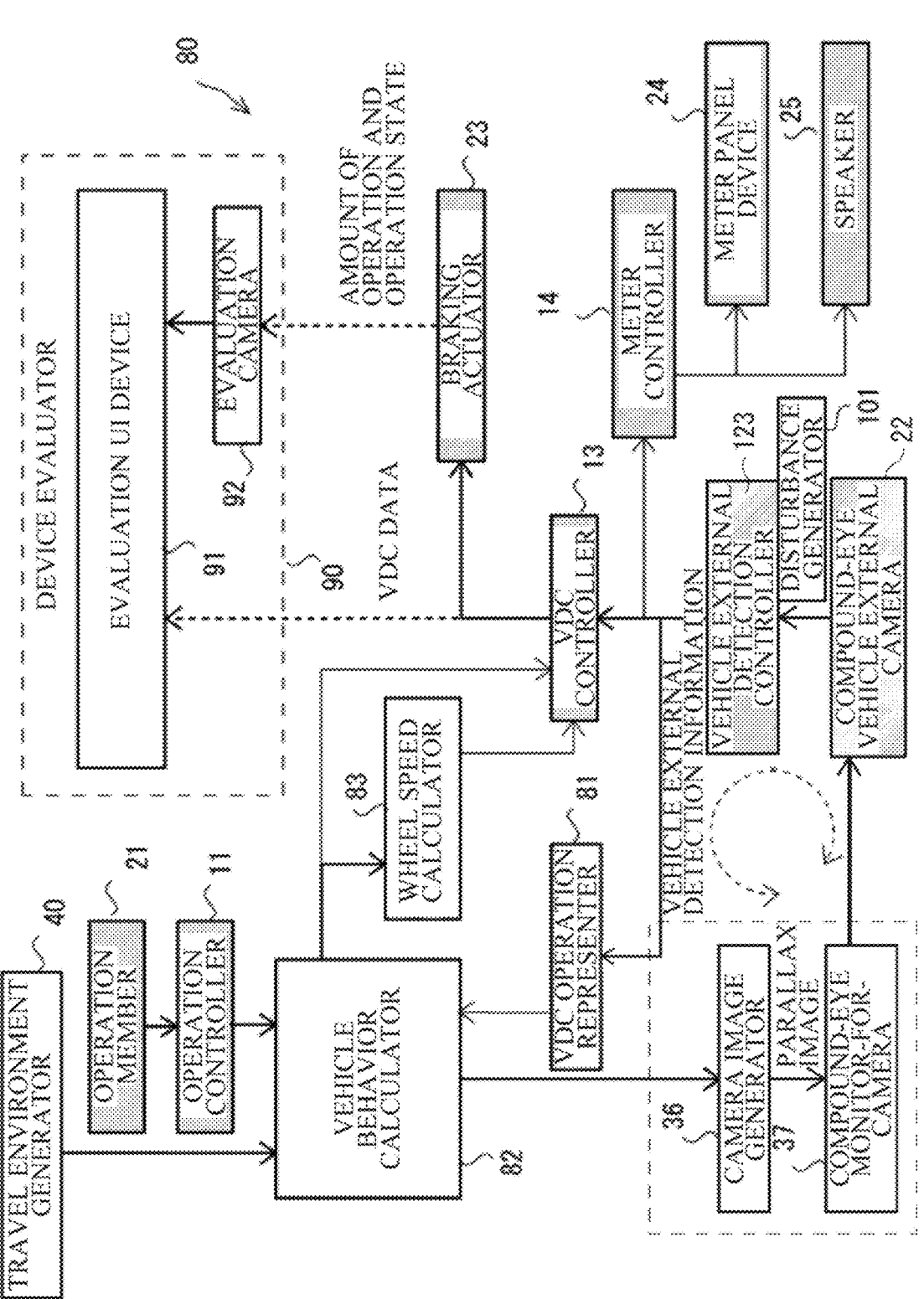

[ FIG. 11 ]
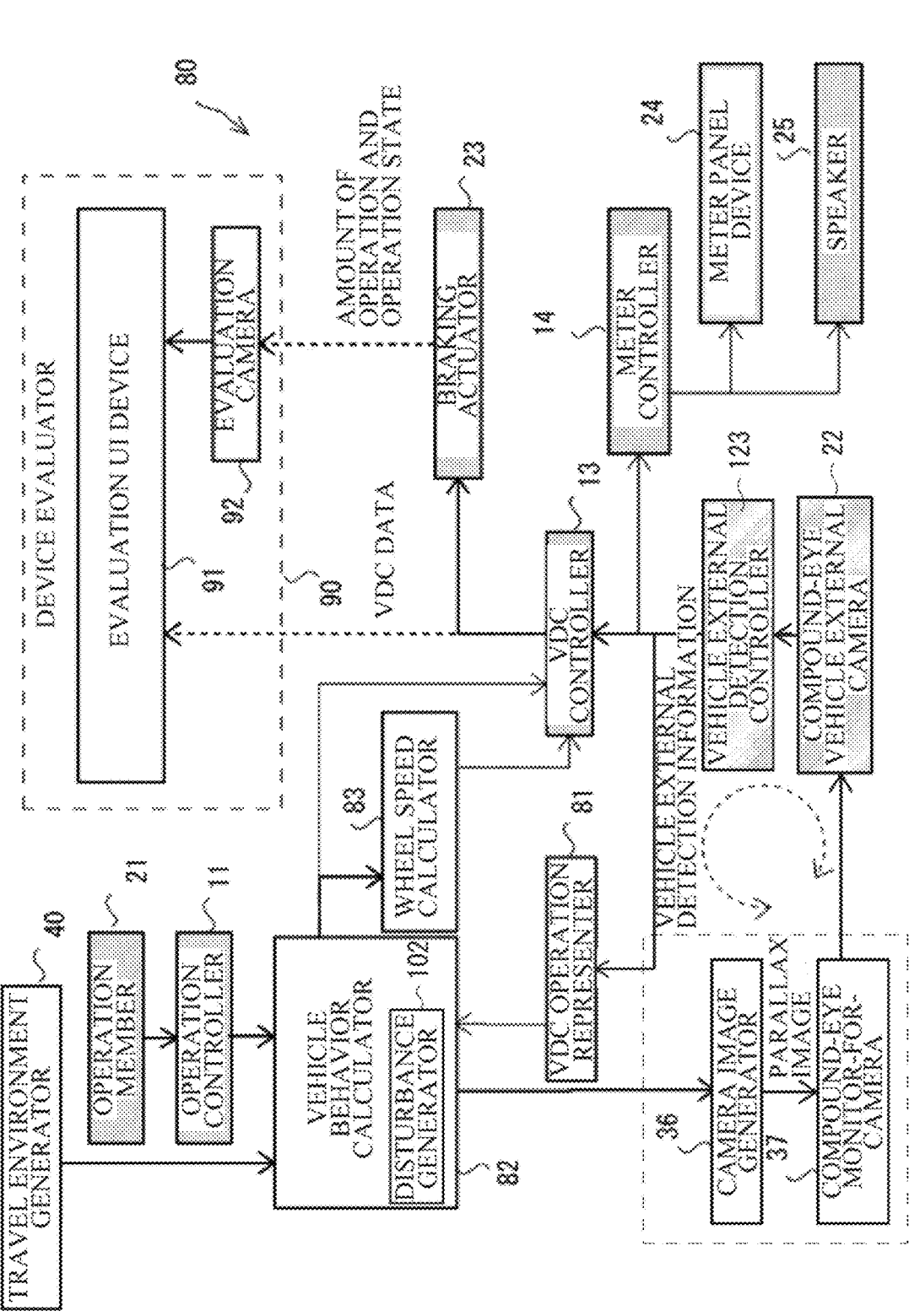

[ FIG. 12 ]
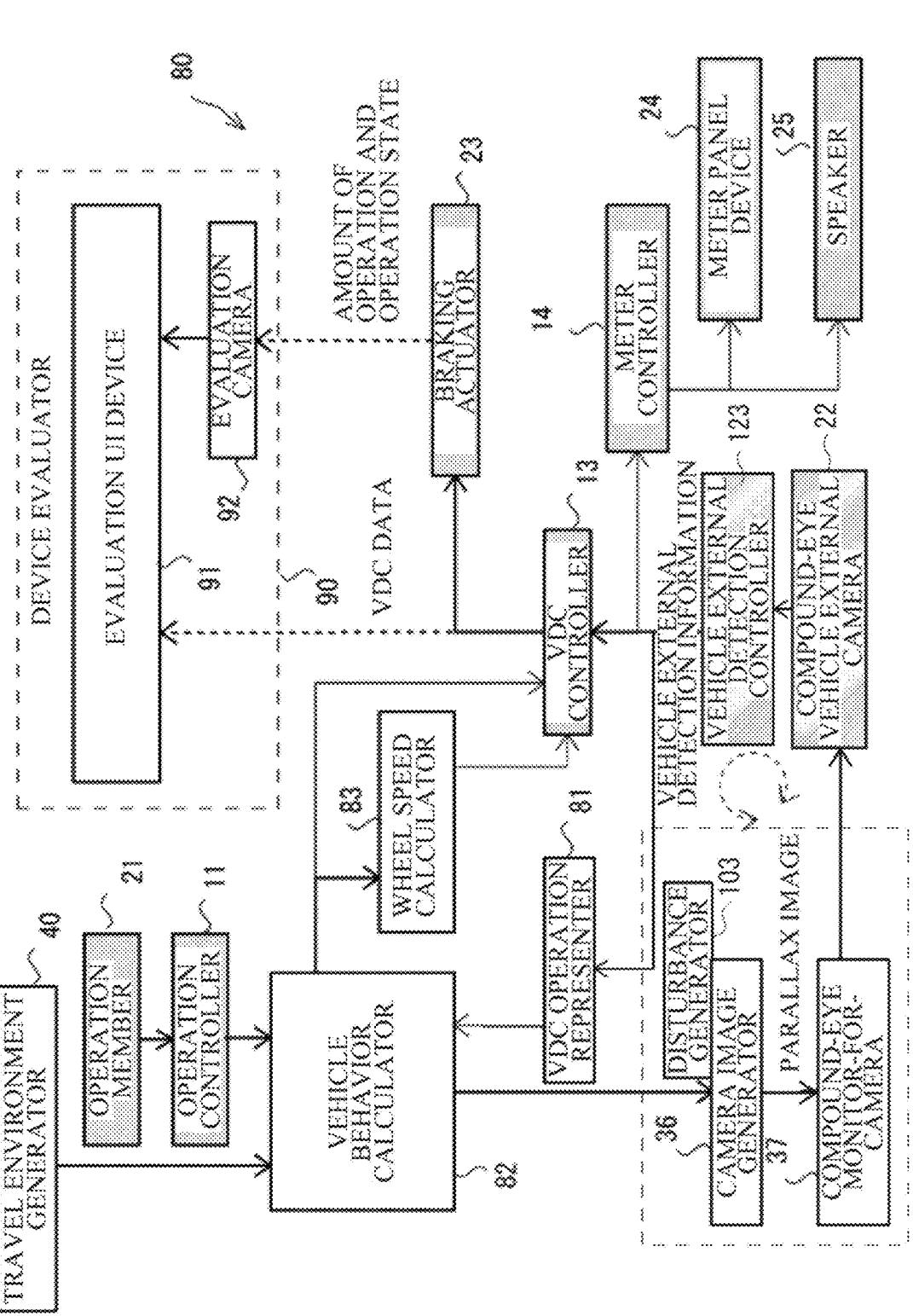

[ FIG. 13 ]
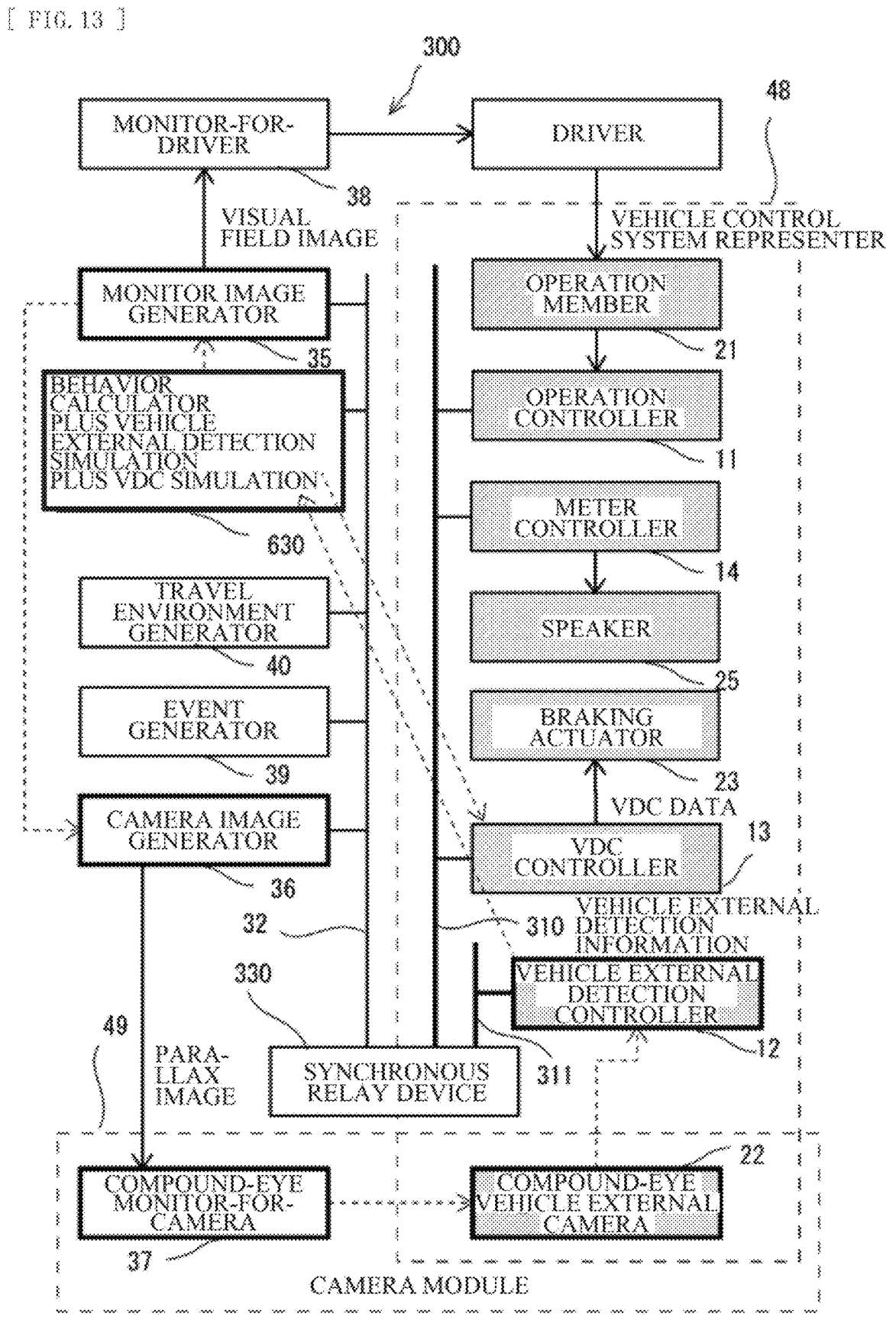

SIMULATION SYSTEM FOR VEHICLE

CROSS-REFERENCE TO RELATED APPLICATIONS

This application is the U.S. National Phase under 35 U.S.C. § 371 of International Application No. PCT/JP2023/014577, filed on Apr. 10, 2023, the entire contents of which are hereby incorporated by reference.

TECHNICAL FIELD

The invention relates to a simulation system for a vehicle.

BACKGROUND ART

In a vehicle, for example, as in Patent Literature 1, a large number of controllers are provided in its control system. Moreover, to each controller, various sensors and actuators are coupled.

Furthermore, for vehicles, developments are in progress to enhance its travel safety and convenience. For example, developments are in progress for devices for ADAS (Advanced Driver-Assistance Systems) for automatic braking.

In a device for the automatic braking to be provided in a vehicle, for example, an imaging member to be provided in the vehicle captures an outside of the vehicle. A vehicle external detection controller detects a target as an obstacle-to-travel, based on the captured image of the outside of the vehicle. When any object as an obstacle-to-travel has been detected, a travel controller brings an actuator for braking into operation. Thus, it is possible for the vehicle, when there is an obstacle-to-travel in its direction of advance, to stop short of the obstacle-to-travel.

CITATION LIST

Patent Literature

Patent Literature 1: Japanese Unexamined Patent Application Publication No. 2018-144526

SUMMARY OF INVENTION

Problem to be Solved by the Invention

Meanwhile, for the automatic braking mentioned above, etc., the vehicle external detection controller generates vehicle external detection information regarding, for example, an obstacle-to-travel present on a course, based on the captured image of the outside of the vehicle, and outputs the vehicle external detection information to an in-vehicle network. The travel controller acquires the vehicle external detection information from the in-vehicle network, and carries out a control to bring an actuator for braking of the vehicle into operation, in accordance with the vehicle external detection information. Moreover, in developments of a vehicle, the vehicle external detection controller and the travel controller are sometimes developed separately. In this case, verification and evaluation of the travel controller is performed by actual running, with the travel controller incorporated in the vehicle together with the vehicle external detection controller.

However, for example, making reliable such verification of the travel controller by the actual running assumes that the developments of the vehicle external detection controller have progressed to a considerable extent and the vehicle external detection controller operates reliably. Accordingly, the verification of the travel controller is feasible at a stage where the developments of the vehicle have progressed to a considerable extent. Moreover, correction work of the travel controller to reflect a result of the verification is also made after the verification at the stage where the developments of the vehicle have progressed to a considerable extent.

Moreover, when a verification result by the actual running is not desirable, the developer makes the correction work on the vehicle based on the result. However, solely with the verification result by the actual running, the developer may be possibly confused in determining whether to make the correction work on either the vehicle external detection controller or the travel controller, or whether to make the correction work on both. There is possibility that the developer is confused in making a determination as to isolation of points that should be corrected.

By these circumstances and the like, a long period of time is necessary for the developments of the vehicle including the travel controller to be developed together with the vehicle external detection controller.

As described, in a vehicle, it is desirable to facilitate verification of a travel controller to be used in combination with a vehicle external detection controller.

Means for Solving the Problem

A simulation system for a vehicle according to an aspect of the invention is a simulation system for a vehicle to allow a vehicle external detection controller and a travel controller to operate. The vehicle external detection controller is configured to output vehicle external detection information based on a captured vehicle external image. The travel controller is configured to control operation of an actuator for a travel control of the vehicle in accordance with the vehicle external detection information. The simulation system includes: a control operation representer configured to acquire the vehicle external detection information outputted by the vehicle external detection controller and represents a control output of the travel controller or an operation output of the actuator in accordance with the vehicle external detection information; a vehicle behavior calculator configured to calculate behavior of the vehicle by using an output of the control operation representer; a vehicle external image generator configured to generate a vehicle external image in a travel state of the vehicle variable with the operation of the actuator, by using a calculation result of the vehicle behavior calculator; a display member configured to display the vehicle external image generated by the vehicle external image generator; and an imaging member configured to capture the vehicle external image displayed by the display member and outputs a captured vehicle external image to the vehicle external detection controller. The vehicle external detection controller is configured to operate under the travel state of the vehicle generated by a closed loop including the control operation representer, the vehicle behavior calculator, the vehicle external image generator, the display member, and the imaging member. The travel controller is configured to operate in accordance with the vehicle external detection information generated by the vehicle external detection controller operating in the closed loop or information equivalent to the vehicle external detection information generated by the vehicle external detection controller.

Effects of the Invention

In the invention, the vehicle external detection controller that outputs the vehicle external detection information based on the captured vehicle external image operates in the closed loop by the control operation representer, the vehicle behavior calculator, the vehicle external image generator, the display member, and the imaging member. The vehicle external detection controller is configured to operate in the closed loop that generates the travel state of the vehicle. Moreover, this closed loop does not include the travel controller as a verification target. The travel controller is provided outside the closed loop. Thus, it is possible for the closed loop to reliably generate the travel state of the vehicle. It is possible for the vehicle external detection controller to reliably operate in the travel state of the vehicle in the closed loop, without being influenced by operation of the travel controller as the verification target.

Moreover, in the invention, the travel controller operates in accordance with the vehicle external detection information generated by the vehicle external detection controller that operates in such a closed loop, or the information equivalent to the vehicle external detection information generated by the vehicle external detection controller. Thus, it is possible for the travel controller to control the operation of the actuator for a travel control of the vehicle that possibly changes behavior of the vehicle, in accordance with the vehicle external detection information by the vehicle external detection controller that operates reliably in the travel state of the vehicle in the closed loop. It is possible for the travel controller to reliably operate in the travel state of the vehicle in the closed loop. Moreover, for example, when the control of the travel controller or the operation of the actuator is not desirable regardless of the travel controller operating reliably in the closed loop, it is possible for the developer to make correction work on the travel controller as the verification target or the actuator.

Moreover, in the invention, as to the vehicle external detection controller as well that outputs the vehicle external detection information to the travel controller, it is possible to easily make a determination based on whether the closed loop is reliably in operation. It is possible for the developer to obtain, as the verification result, not only a verification result of the travel controller but also a verification result of the vehicle external detection controller that is allowed to operate together with the travel controller. The developer is less confused in making a determination as to isolation of points that should be corrected.

Furthermore, using the simulation system for the vehicle according to the invention makes it possible for the developer to allow the travel controller to make control operation and verify its result, without depending on actual running tests, with the travel controller as the verification target incorporated in the vehicle together with the vehicle external detection controller. It is possible for the developer to start, at an early stage, the verification of the control operation of the travel controller in combination with the vehicle external detection controller, in an environment close to an actual vehicle, even at a stage where the developments of the vehicle has not progressed, without incorporating the travel controller in the vehicle together with the vehicle external detection controller.

As described, in the invention, it is possible to make feasible, at an early stage, the verification of the control operation of the travel controller to be used in combination with the vehicle external detection controller in the vehicle, and to facilitate developments of a vehicle.

BRIEF DESCRIPTION OF DRAWINGS

FIG. 1 is an illustrative diagram of an example of a configuration of a control system of an automobile.

FIG. 2 is an illustrative diagram of a control and operation for automatic braking in the automobile in FIG. 1.

FIG. 3 is an illustrative diagram of an example of a basic configuration of a simulation system for an automobile, available for use for evaluation of operation of the control system of the automobile in FIG. 1.

FIG. 4 is an illustrative diagram of an example of a computer device available for use as a behavior calculator in FIG. 3.

FIG. 5 is an illustrative diagram of a basic configuration of a simulation system for an automobile, according to a first embodiment of the invention.

FIG. 6 is a block diagram of a simulation system to be realized in the basic configuration in FIG. 5, for evaluation of operation of the automobile.

FIG. 7 is a schematic illustrative diagram to indicate operation timing of the basic simulation system in FIG. 5, in the simulation system in FIG. 6.

FIG. 8 is a flowchart that illustrates an overall control flow for the evaluation of the operation for the automatic braking, in the simulation system in the embodiment.

FIG. 9 is a block diagram of a simulation system for an automobile, according to a second embodiment of the invention.

FIG. 10 is a block diagram of a simulation system for an automobile, according to a third embodiment of the invention.

FIG. 11 is a block diagram of a simulation system for an automobile, according to a fourth embodiment of the invention.

FIG. 12 is a block diagram of a simulation system for an automobile, according to a fifth embodiment of the invention.

FIG. 13 is an illustrative diagram of a basic configuration of a simulation system for an automobile, according to a sixth embodiment of the invention.

Modes for Carrying Out the Invention

In the following, some embodiments of the invention are described with reference to the drawings.

First Embodiment

FIG. 1 is an illustrative diagram of an example of a configuration of a control system 10 of an automobile. FIG. 1 illustrates an example of constituent elements related to automatic braking out of constituent elements provided in the control system 10 of the automobile. The control system 10 of the automobile may include, for example, controllers, sensors, and actuators that are not illustrated in FIG. 1.

The control system 10 of the automobile in FIG. 1 includes an in-vehicle network 16 to which controllers are coupled. The in-vehicle network 16 may be, for example, a network conforming to standards for automobiles such as a CAN (Controller Area Network) and a LIN (Local Interconnect Network). Such an in-vehicle network 16 generally includes bus cables and a central gateway (CGW) to which the bus cables are bus-coupled. The controllers may be coupled to the bus cables in a distributed manner. The controllers each output a packet including information regarding a destination and information regarding a sender to the bus cables, and acquire a packet addressed to themselves from the bus cables. The central gateway determines destinations of packets on each bus cable and performs routing processing of the packets between the bus cables. Use of such an in-vehicle network 16 makes it possible for the controllers provided in the automobile to mutually input and output necessary information to and from other controllers while making their respective controls. This makes it possible for the controllers provided in the automobile to cooperate with one another to control, for example, travel of the automobile.

Moreover, in FIG. 1, an operation controller 11, a vehicle external detection controller 12, a VDC (Vehicle Dynamics Control) controller 13, a meter controller 14, and a detection controller 15 are illustrated as the controllers to be coupled to the in-vehicle network 16.

An operation member 21 is coupled to the operation controller 11. The operation member 21 is operated by an occupant such as a driver of the automobile. Examples of the operation member 21 include that which changes behavior of the automobile by an operation by the occupant, e.g., a steering wheel, an accelerator pedal, a brake pedal, and a shift lever. The operation controller 11 detects the operation by the occupant with respect to the operation member 21, and outputs detection information regarding the operation to the in-vehicle network 16.

To the vehicle external detection controller 12, for example, a compound-eye vehicle external camera 22 is coupled to detect, for example, an obstacle-to-travel outside the vehicle, as a surrounding environment of the traveling automobile. In addition, for example, a monocular camera and Lidar may be coupled to the vehicle external detection controller 12. The compound-eye vehicle external camera 22 may include cameras arranged to generate predetermined parallax. The cameras may be any camera configured to capture a range in a predetermined direction, and a 360-degree camera or the like may be also used. Moreover, to the vehicle external detection controller 12, cameras to capture 360-degree surroundings of the automobile may be coupled.

Moreover, the vehicle external detection controller 12 is supplied with a vehicle external image captured by the compound-eye vehicle external camera 22 from, for example, the compound-eye vehicle external camera 22. The vehicle external detection controller 12 may analyze the acquired vehicle external image to extract, for example, an obstacle-to-travel, a traffic signal, a road sign, and a railroad crossing. Here, the obstacle-to-travel may be, for example, a pedestrian, an oncoming vehicle, a bicycle, a preceding vehicle, a following vehicle, a falling object on a road, or the like. Furthermore, the vehicle external detection controller 12 may determine a relative distance and a relative direction from the subject vehicle to the obstacle-to-travel. When the obstacle-to-travel is located on a course of the subject vehicle at a predetermined distance or less, the vehicle external detection controller 12 may output, to the in-vehicle network 16, vehicle external detection information regarding, for example, the obstacle-to-travel present on the course. Here, the vehicle external detection information may be, for example, information regarding an approach alert with respect to an obstacle-to-travel such as a preceding vehicle. In this case, the control system 10 of the automobile may make a control for the automatic braking by notifying the occupant of the fact, and decelerating and stopping the automobile. In addition, the control system 10 of the automobile may make a control to travel while avoiding the obstacle-to-travel by, for example, a steering control.

To the VDC controller 13, an actuator is coupled. The actuator is a device to control the travel of the automobile. FIG. 1 illustrates a braking actuator 23 of a braking device. Moreover, the VDC controller 13 makes a travel control to enhance travel safety of the automobile.

For example, the VDC controller 13 controls operation for braking of the braking actuator 23, to allow the braking actuator 23 to perform braking operation. This makes it possible for the automobile to decelerate and eventually stop. In addition, when a steering actuator of a steering device is coupled to the VDC controller 13, the VDC controller 13 may further control operation for steering of the steering actuator, to allow the subject vehicle to travel while avoiding the obstacle-to-travel.

In addition, for example, when the automobile is traveling along, for example, a curved corner, the VDC controller 13 may control operation of, for example, the braking actuator 23 and the steering actuator, to stabilize a posture of a vehicle body in cornering. At this occasion, the VDC controller 13 may control operation such as braking or steering with respect to some wheels out of wheels provided in a plurality for the automobile.

In this way, the behavior of the automobile possibly changes by the control operation of the VDC controller 13. Moreover, a change in the behavior of the automobile causes a change in a travel state of the automobile, e.g., a speed and an acceleration rate. The VDC controller 13 is configured to control the travel state of the automobile.

It is to be noted that, when acquiring a significant piece of the vehicle external detection information from the in-vehicle network 16, based on presence of the obstacle-to-travel in a direction of advance of the automobile, it is preferable that the VDC controller 13 control the braking operation of the braking actuator 23 to allow the automobile to stop short of the obstacle-to-travel. In contrast, when acquiring an insignificant piece of the vehicle external detection information indicating absence of the obstacle-to-travel in the direction of advance of the automobile, the VDC controller 13 may refrain from making a control to bring, for example, the braking actuator 23 into operation.

To the meter controller 14, a meter panel 24 is coupled. The meter panel 24 is provided on, for example, a dashboard of the automobile. Accordingly, the meter panel 24 may be provided in front of the driver as the occupant of the automobile. The meter panel 24 may be, for example, a liquid crystal panel device. The meter controller 14 controls a display output of the meter panel 24. The meter controller 14 allows the meter panel 24 to display information indicating the travel state of the automobile, e.g., the speed of the automobile, an alert message, and the like.

Moreover, in the embodiment, a speaker 25 is further coupled to the meter controller 14. When acquiring the vehicle external detection information from the in-vehicle network 16, based on, for example, the presence of the obstacle-to-travel in the direction of advance of the automobile, the meter controller 14 displays the alert message on the meter panel 24 and outputs an alert sound from the speaker 25. With these alerts, it is possible for the occupant of the automobile to be careful about the direction of advance of the subject vehicle and recognize that an object present in the direction of advance of the subject vehicle is an obstacle-to-travel on the course of the subject vehicle.

To the detection controller 15, various sensors provided in the automobile are coupled. In FIG. 1, a wheel speed sensor 26, an acceleration rate sensor 27, and a speed sensor 28 are illustrated as examples.

The wheel speed sensor 26 detects rotational speeds of the wheels of the automobile.

The acceleration rate sensor 27 detects the acceleration rate of the automobile. The acceleration rate sensor 27 may be a three-axis sensor configured to detect the acceleration rate in each of a yaw direction, a pitch direction, and a roll direction of the automobile.

The speed sensor 28 detects the speed of the automobile.

Thus, the detection controller 15 may output detection information by these sensors, e.g., a current speed, the acceleration rate, and wheel speeds of the automobile, to the in-vehicle network 16. Furthermore, the detection controller 15 may output, to the in-vehicle network 16, predetermined information obtained by processing the detection information by the sensors.

FIG. 2 is an illustrative diagram of the control and operation for the automatic braking in the automobile in FIG. 1.

FIG. 2 illustrates the compound-eye vehicle external camera 22, the vehicle external detection controller 12 as a detection controller, the VDC controller 13 as a travel controller, and the braking actuator 23 in the control system 10 of the automobile in FIG. 1.

Moreover, in FIG. 2, time flows from the left to the right on the sheet.

Thus, as illustrated in FIG. 2, at the time t1, the compound-eye vehicle external camera 22 captures the outside of the vehicle in the travel state of the automobile at that point in time, and outputs the vehicle external image. The vehicle external detection controller 12 analyzes the vehicle external image, and outputs the vehicle external detection information regarding, for example, the obstacle-to-travel. Upon acquiring the vehicle external detection information, the VDC controller 13 makes a control in accordance with the contents of the information, generates VDC data, and outputs the VDC data to, for example, the braking actuator 23. The braking actuator 23 operates in accordance with the VDC data. This causes the change in the behavior of the automobile, and also causes the change in the travel state of the automobile. Here, the VDC data refers to control information to be generated by the VDC controller 13 to control the operation of the braking actuator 23 or the like, and outputted to the braking actuator 23 or the like.

Moreover, at the time t2, the compound-eye vehicle external camera 22 captures the outside of the vehicle in the travel state of the automobile at the point in time after the change, and outputs the vehicle external image. The vehicle external detection controller 12 analyzes the vehicle external image, and outputs the vehicle external detection information regarding, for example, the obstacle-to-travel. Upon acquiring the vehicle external detection information, the VDC controller 13 generates the VDC data and outputs the VDC data. The braking actuator 23 operates in accordance with the VDC data. This causes the change in the behavior of the automobile, and also causes the change in the travel state of the automobile.

Furthermore, at the time t3, the compound-eye vehicle external camera 22 captures the outside of the vehicle in the travel state of the automobile at the point in time after the change, and outputs the vehicle external image. The vehicle external detection controller 12 analyzes the vehicle external image, and outputs the vehicle external detection information regarding, for example, the obstacle-to-travel. Upon acquiring the vehicle external detection information, the VDC controller 13 generates the VDC data and outputs the VDC data. The braking actuator 23 operates in accordance with the VDC data. This causes the change in the behavior of the automobile, and also causes the change in the travel state of the automobile.

As described, allowing the multiple devices to cooperate with one another to repeatedly perform the control operation on predetermined cycles makes it possible for the control system 10 of the automobile to control the travel of the automobile to make the automobile stop short of the obstacle-to-travel.

It is to be noted that the time t1 to t3 in FIG. 2 is an example. However, in an automobile using the CAN or the like, the vehicle external detection controller 12 and the VDC controller 13 input and output the vehicle external detection information on cycles of time slots allocated by the CAN. That is, the vehicle external detection controller 12 outputs the vehicle external detection information to the in-vehicle network 16 at timing of the allotted time slot. The VDC controller 13 acquires, at the allotted timing, the vehicle external detection information as information regarding the time slot from the in-vehicle network 16. As described, in the automobile, the vehicle external detection controller 12 and the VDC controller 13 input and output the vehicle external detection information as a first output by using the time slots allocated for periodic communication through the in-vehicle network 16.

As described, the control system 10 of the automobile includes the controllers that cooperate with one another. Moreover, to each of the controllers, various sensors and actuators are coupled.

Moreover, for example, when developing a new automobile, the various controllers to be used in the automobile, the compound-eye vehicle external camera 22 and the sensors as input devices, and the actuators as output devices have to be subjected to a single test in a bench test, and thereafter, subjected to a final operation test in a state where they are incorporated in the control system 10.

Moreover, evaluation of the operation in a state where the devices are incorporated in the control system 10 of the automobile is currently performed by actually running the automobile. In particular, an operation check and evaluation at a final stage of a device to be newly developed are carried out by actually running the automobile, with the device incorporated in the automobile together with other devices. Furthermore, even in a case of checking and evaluating the operation with respect to one item, the driver is expected to allow the automobile to actually run multiple times. The evaluation in the developments of an automobile takes a large number of processes and a long time.

Meanwhile, in automobiles, developments to enhance their travel safety and convenience are in progress. For example, developments of apparatuses for the ADAS for the automatic braking and automated driving are in progress.

Thus, in the future, the control system 10 of the automobile is expected to become more sophisticated and more complicated than the current one.

Moreover, when the control system 10 of the automobile becomes more sophisticated or more complicated, the number of items of the operation check and the contents of the evaluation with respect to each controller, each sensor, and each actuator to be provided in the control system 10 are also expected to increase. As to the various controllers, sensors, and actuators to be provided in the more sophisticated and more complicated control system 10 of the automobile, evaluating their operation as being more reliable is expected to involve a dramatic increase in the number of processes and time for the evaluation.

As described, in automobiles, it is desirable to facilitate the evaluation of the operation of the various devices to be used in the control system 10.

It is to be noted that such evaluation of the operation is not limited to the case of developing a new automobile. For example, as to devices for mass-produced automobiles, devices for automobiles after sales, or the like, evaluation of their operation is sometimes desirable. Currently, such evaluation of the operation of mass-produced automobiles, automobiles after sales, or the like is also carried out by actually running the automobile, basically in a state in which the devices are incorporated in the automobile.

Next, description is given of a simulation system for an automobile, developed independently by the inventors, for use in such evaluation of the operation of the control system 10 of the automobile.

FIG. 3 is an illustrative diagram of an example of a basic configuration of a simulation system 30 for an automobile, available for the evaluation of the operation of the control system 10 of the automobile in FIG. 1.

The simulation system 30 of the automobile in FIG. 3 includes the in-vehicle network 16 to which the various devices of the control system 10 of the automobile are coupled. The in-vehicle network 16 may be the in-vehicle network 16 itself to be used in the control system 10 of the automobile. To the simulation system 30 in FIG. 3, the multiple devices illustrated in FIG. 1 are coupled. However, illustration of a part of the detection controller 15 in FIG. 1 is omitted for want of space. Thus, it is possible to incorporate the various devices of the control system 10 of the automobile in the simulation system 30 in a state in which they are to be mounted on the automobile. Moreover, by coupling, to the in-vehicle network 16, other controllers of the automobile than illustrated in FIG. 1 and all devices of the control system 10 of the automobile, it is possible to reliably represent a communication environment in an actual automobile, in the simulation system 30.

For example, when the operation controller 11 is coupled to the in-vehicle network 16, it is possible for the driver of the automobile to allow the automobile to travel in a virtual space in the simulation system 30 by operating the operation member 21.

It is to be noted that, in the simulation system 30, the various devices of the control system 10 of the automobile constitute a vehicle control system representer 48. The hatched boxes in FIG. 3 are the various devices illustrated in the control system 10 of the automobile in FIG. 1.

Moreover, in addition to the in-vehicle network 16, the simulation system 30 in FIG. 3 includes a main communication network 32, a synchronous relay device 33, an event generator 39, a travel environment generator 40, a behavior calculator 34, a monitor image generator 35, a monitor-for-driver 38, a camera image generator 36, and a compound-eye monitor-for-camera 37.

The main communication network 32 may be a communication network commonly used in the communication between computer devices. Such a communication network includes, for example, that which complies with the IEEE (Institute of Electrical and Electronics Engineers) 802.3 standards.

Moreover, to the main communication network 32, the synchronous relay device 33, the event generator 39, the travel environment generator 40, the behavior calculator 34, the monitor image generator 35, and the camera image generator 36 are coupled. These devices to be coupled to the main communication network 32 are configured to transmit and receive information to and from one another by, for example, packet communication.

The synchronous relay device 33 is coupled to the main communication network 32 and the in-vehicle network 16. Moreover, the synchronous relay device 33 relays information between the in-vehicle network 16 and the main communication network 32. This makes it possible to output the information in the in-vehicle network 16 to the main communication network 32 through the synchronous relay device 33. It is possible to output the information in the main communication network 32 to the in-vehicle network 16 through the synchronous relay device 33. The devices to be coupled to the main communication network 32 and the devices to be coupled to the in-vehicle network 16 are configured to transmit and receive necessary information through the synchronous relay device 33.

Moreover, instead of relaying all the information in the in-vehicle network 16 to the main communication network 32, or relaying all the information in the main communication network 32 to the in-vehicle network 16, it is preferable that the synchronous relay device 33 filter the information and relay only a part of the information. The in-vehicle network 16 is basically the in-vehicle network 16 to be incorporated in the automobile. In the in-vehicle network 16 for the automobile, as described above, the kind, the timing, and the like of the information to be communicated are defined by, for example, the time slots. It is preferable that the synchronous relay device 33 relay only information that is insufficient on the side of the in-vehicle network 16, from the main communication network 32 to the in-vehicle network 16, based on predetermined filtering setting. Moreover, it is preferable that the synchronous relay device 33 relay only information necessary in the main communication network 32, from the in-vehicle network 16 to the main communication network 32, based on the predetermined filtering setting.

The event generator 39 generates an event in the virtual space when allowing the automobile to travel in the virtual space. For example, the event generator 39 holds in advance information regarding a position and the time of an event with respect to a pedestrian, an oncoming vehicle, a bicycle, a preceding vehicle, a following vehicle, a falling object on a road, a traffic signal, a railroad crossing, and the like. The event generator 39 generates event information at the time and the position in the virtual space, and outputs the event information to the main communication network 32.

The travel environment generator 40 holds in advance high-precision three-dimensional space data such as high-precision map data, and data regarding a predetermined scenario about the travel of the automobile. Moreover, when allowing the automobile to travel in the virtual space, the travel environment generator 40 generates a virtual space around the automobile, based on the three-dimensional space data and the scenario, with reference to a position of the automobile in the virtual space. When having acquired the event information from the main communication network 32, the travel environment generator 40 arranges an object corresponding to the event in the virtual space related to the event information. The travel environment generator 40 outputs, to the main communication network 32, information regarding the position of the automobile and information regarding the virtual space that have been generated by itself.

The behavior calculator 34 calculates the behavior of the automobile traveling in the virtual space. For example, the behavior calculator 34 calculates the behavior and the travel state of the automobile at the moment, by using the previous behavior and the previous travel state of the automobile and information acquirable from the main communication network 32. It is preferable that the behavior calculator 34 acquire, from the main communication network 32, information regarding the operation on the operating member 21, the control information regarding the VDC controller 13 such as the VDC data described above, and the like. This makes it possible for the behavior calculator 34 to calculate the behavior and the travel state of the automobile in accordance with the operation on the operation member 21, the control by the VDC controller 13, and the like. The behavior calculator 34 basically calculates the speed, the acceleration rate, pitch behavior, roll behavior, and yaw behavior, etc. of the automobile based on information related to the control operation of the automobile. Furthermore, based on the calculated behavior, the behavior calculator 34 may further calculate the travel state of the automobile after the behavior. The behavior calculator 34 outputs, to the main communication network 32, the information regarding the behavior and the travel state of the automobile that has been generated by itself.

To the monitor image generator 35, the monitor-for-driver 38 is coupled. The monitor-for-driver 38 provides the driver of the simulation system 30 with display of a visual field image from the automobile. The monitor image generator 35 acquires, for example, the information regarding the position of the automobile, the information regarding the virtual space, the information regarding the behavior and the travel state of the automobile, from the main communication network 32. The monitor image generator 35 generates the visual field image of the three-dimensional virtual space viewed from the position of the automobile. The monitor image generator 35 may basically generate the visual field image of a range including a frontward direction from the automobile as the direction of advance of the automobile. The monitor image generator 35 outputs the generated visual field image to the monitor-for-driver 38 and the camera image generator 36. Thus, on the monitor-for-driver 38, the visual field image of the virtual space as viewed from the automobile traveling in the virtual space is displayed. In the simulation system 30, it is possible for the driver to travel in the virtual space, with the visual field image that changes with the driver's operation on the operation member 21.

To the camera image generator 36, the compound-eye monitor-for-camera 37 is coupled. The compound-eye monitor-for-camera 37 constitutes a camera module together with the compound-eye vehicle external camera 22 of the automobile. The compound-eye monitor-for-camera 37 includes monitors corresponding one-to-one to the respective cameras constituting the compound-eye vehicle external camera 22. In the camera module, the monitors of the compound-eye monitor-for-camera 37 may be disposed opposite to the respective cameras of the compound-eye vehicle external camera 22.

Moreover, the camera image generator 36 acquires the visual field image generated by the monitor image generator 35 from the main communication network 32, and generates parallax images to be displayed on the respective monitors of the compound-eye monitor-for-camera 37.

It is to be noted that the camera image generator 36 may acquire, for example, the information regarding the position of the automobile, the information regarding the virtual space, and the information regarding the behavior and the travel state of the automobile, from the main communication network 32, and generate the parallax images directly from these pieces of the information. The camera image generator 36 outputs the generated parallax images to the compound-eye monitor-for-camera 37. The compound-eye monitor-for-camera 37 displays, on its monitors, the parallax images equivalent to those visually recognized by the driver. It is possible for the compound-eye vehicle external camera 22 of the automobile to capture the parallax image by its cameras. Accordingly, in the simulation system 30, it is possible for the compound-eye vehicle external camera 22 of the automobile to capture the parallax images viewed from the automobile traveling in the virtual space.

Moreover, the camera image generator 36 may acquire the information regarding the behavior of the automobile generated by the behavior calculator 34 from the behavior calculator 34 through the main communication network 32, and generate by itself the information regarding the travel state of the automobile.

FIG. 4 is an illustrative diagram of an example of a computer device 50 available for use as the behavior calculator 34 in FIG. 3.

It is to be noted that other devices for evaluation than the behavior calculator 34 in the simulation system 30 in FIG. 3, e.g., the travel environment generator 40, the event generator 39, the monitor image generator 35, the camera image generator 36, the synchronous relay device 33, and the like may also use the similar computer device 50 to that in FIG. 4. Moreover, the devices for evaluation in FIG. 3 may be integrated and realized in the single computer device 50. On the occasion of the integration, it is preferable that a processing load on each device for evaluation be taken into consideration. Furthermore, when the processing load on one of the devices for evaluation in FIG. 3 is high, the relevant one of the devices for evaluation may be realized by being distributed in a plurality of the computer devices 50. Each device for evaluation in FIG. 3 basically needs to be installed in the simulation system 30 not to be delayed with respect to the time slot communication in the in-vehicle network 16 of the automobile.

The computer device 50 in FIG. 4 includes a communication port 51, a timer 52, a memory 53, a CPU 54 (Central Processing Unit), and an internal bus 55 to which these are coupled.

The communication port 51 is coupled to the main communication network 32 of the simulation system 30.

The timer 52 measures the time or time.

The memory 53 holds a calculation program to be executed by the CPU 54, setting data, and the like. The memory 53 may include a nonvolatile memory such as a HDD (Hard Disk Device), an SSD (Solid State Device), a ROM (Read Only Memory), and a volatile memory such as a RAM (Random Access Memory). In this case, the calculation program, the setting data, and the like may be held in the non-volatile memory.

The CPU 54 reads the calculation program held in the memory 53 and executes the calculation program. Thus, in the computer device 50, its controller is realized.

The CPU 54 as the controller controls operation of the computer device 50 and makes a control as, for example, the behavior calculator 34 described above.

Thus, the computer device 50 in FIG. 4 is configured to serve as, for example, the behavior calculator 34 and the like in the simulation system 30 in FIG. 3.

As described, in the simulation system 30 for the automobile in FIG. 3, by incorporating, for example, the control system 10 of the automobile for the automatic braking in FIG. 1 in the vehicle control system representer 48 together with the in-vehicle network 16, it is possible to represent their operation in a state where the automobile is traveling in the virtual space. It is possible for the developer of the automobile and the like to obtain information for evaluation of a control and operation of a device of the automobile under development, by using the simulation system 30 for the automobile in FIG. 3. By using the simulation system 30 for the automobile in FIG. 3, it is possible for the developer of the automobile and the like to reliably evaluate, without incorporating each device of the automobile under development in the automobile, the control and the operation of each device of the automobile. Even when the control system 10 of the automobile is becoming more sophisticated or more complicated, it is possible to effectively and reliably evaluate an increasing number of evaluation items for each device of the automobile under development, by using the simulation system 30 for the automobile in FIG. 3. As to the various devices to be used in the control system 10 of the automobile, it is possible to evaluate their operation by a bench test, and drastically facilitate the evaluation of the operation, as compared with a case where the evaluation of the operation is made with an actual vehicle. As a result, it is expected that the control and the operation of each device to be developed can be more reliable than in the case with an actual vehicle.

However, in the simulation system 30 for the automobile in FIG. 3 as is, there is possibility that it takes time and effort to evaluate the device under development.

In the simulation system 30 for the automobile in FIG. 3, a closed loop L1 illustrated in FIG. 2 is realized by the devices indicated by the thick-bordered boxes in FIG. 3. That is, in FIG. 3, the closed loop includes the monitor image generator 35, the camera image generator 36, the compound-eye monitor-for-camera 37, the compound-eye vehicle external camera 22, the vehicle external detection controller 12, the VDC controller 13, and the behavior calculator 34.

In this case, the closed loop in FIG. 3 includes the vehicle external detection controller 12 and the VDC controller 13 as the devices to be provided in the automobile. In the automobile, the vehicle external detection controller 12 generates the vehicle external detection information based on a captured vehicle external image that changes in accordance with the travel state of the automobile, and outputs the vehicle external detection information to the in-vehicle network 16. The VDC controller 13 acquires the vehicle external detection information from the in-vehicle network 16. In accordance with the acquired vehicle external detection information, the VDC controller 13 controls operation of an actuator for a travel control of the automobile that possibly changes the behavior of the automobile. Thus, the simulation system 30 for the automobile in FIG. 3 is configured to evaluate the automatic braking in which the vehicle external detection controller 12 and the VDC controller 13 cooperate with each other.

Meanwhile, in the control system 10 of the automobile, a large number of controllers are provided. Moreover, to each of the controllers, various sensors and actuators are coupled.

As described above, the vehicle external detection controller 12 generates the vehicle external detection information based on the captured vehicle external image for the automatic braking or the like, and outputs the vehicle external detection information to the in-vehicle network 16. The VDC controller 13 acquires the vehicle external detection information from the in-vehicle network 16, and in accordance with the vehicle external detection information, makes a control to allow an actuator for braking of the automobile to operate.

Moreover, in the developments of the automobile, basically, the devices may be developed by the different developers. For example, the vehicle external detection controller 12 and the VDC controller 13 are possibly developed by the different developers. In this case, the evaluation of the operation of the VDC controller 13 needs to be made, with the VDC controller 13 incorporated in the automobile together with the vehicle external detection controller 12.

However, for example, making reliable such evaluation of the VDC controller 13 assumes that the developments of the vehicle external detection controller 12 have been advanced to a considerable extent. Accordingly, the evaluation of the VDC controller 13 becomes feasible only at a stage where the developments of the automobile including the vehicle external detection controller 12 have been advanced to a considerable extent. As a result, correction work of the VDC controller 13 reflecting a result of the evaluation is also made only at a stage where the developments of the automobile have been advanced to a considerable extent.

Moreover, when the result of the evaluation in combination with the vehicle external detection controller 12 is not desirable, the developer has to make the correction work on the automobile based on the result. However, based on solely the result of the evaluation in combination with the vehicle external detection controller 12, the developer may be possibly confused in determining whether to make the correction work on either the vehicle external detection controller 12 or the VDC controller 13, or whether to make the correction work on both. The developer is expected to estimate and determine isolation of points that should be corrected, based on the result of the evaluation of the combination. There is possibility that the developer is confused in making a determination as to the appropriate isolation of the points that should be corrected.

By these circumstances and the like, a long period of time is necessary for the developments of the automobile including the VDC controller 13 to be developed together with vehicle external detection controller 12.

As to automobiles, it is desirable to make it possible to make feasible, at an early stage, the evaluation of the VDC controller 13 to be used in combination with the vehicle external detection controller 12, and to facilitate the developments of the automobile.

Moreover, the simulation system 30 for the automobile in FIG. 3 basically makes it possible to make feasible, at an early stage, the evaluation of the VDC controller 13 to be used in combination with the vehicle external detection controller 12, and to facilitate the developments of the automobile.

However, the closed loop in FIG. 3 includes the VDC controller 13 as an evaluation target. Moreover, when the VDC controller 13 as the evaluation target does not perform the control operation reliably, the closed loop in FIG. 3 also fails in operating reliably.

Thus, when the VDC controller 13 as the evaluation target is incorporated in the closed loop itself of the simulation system 30, even if the evaluation is made in that state, a situation may arise that it is hard to say that the result of the evaluation has been obtained in a desirable state.

It is to be noted that such a situation is not limited to the combination of the vehicle external detection controller 12 and the VDC controller 13. Generally speaking, in an automobile, a similar situation may arise with a combination of an input-side controller (first device) that outputs a first output to the in-vehicle network 16 and an output-side controller (second device) that acquires the first output from the in-vehicle network 16 and carries out a control. In particular, when the input-side controller (first device) detects a target that can change with the travel state of the automobile and outputs the first output to the VDC controller 13 through the in-vehicle network 16, and the output-side controller (second device) acquires the first output from the in-vehicle network 16 and controls, in accordance with the first output, operation of an actuator of the automobile that possibly changes the behavior of the automobile, it is necessary to construct a closed loop as described above in the simulation system 30 for the automobile in FIG. 3.

FIG. 5 is an illustrative diagram of a basic configuration of a simulation system 60 for an automobile, according to the first embodiment of the invention.

The simulation system 60 in FIG. 5 is an improvement on the simulation system 30 in FIG. 3.

The simulation system 60 in FIG. 5 includes a main simulator 601, a sub-simulator 602, an inter-device relay device by a first inter-device relay 70 and a second inter-device relay 71, and a device verifier 90 as a detector.

Moreover, the simulation system 60 in FIG. 5 is suitable for the evaluation of the VDC controller 13 to be used in the automobile in combination with the vehicle external detection controller 12 for the automatic braking of the automobile.

The device verifier 90 is a device that detects and evaluates operation of the braking actuator 23 that operates under the control of the VDC controller 13. Details are described later.

As with the simulation system 30 in FIG. 3, the main simulator 601 includes the main in-vehicle network 31, the main communication network 32, a first synchronous relay device 61, the event generator 39, the travel environment generator 40, a first behavior calculator 63, the monitor image generator 35, and the camera image generator 36. Here, the main in-vehicle network 31 may be the in-vehicle network 16 itself to be used in the control system 10 of the automobile, or may be that which is equivalent thereto. To the main communication network 32, the first synchronous relay device 61, the event generator 39, the travel environment generator 40, the first behavior calculator 63, the monitor image generator 35, and the camera image generator 36 are coupled. To the camera image generator 36, the compound-eye monitor-for-camera 37 is coupled. Here, to the first synchronous relay device 61, the first inter-device relay 70 is added. However, the first synchronous relay device 61 may be basically similar to the synchronous relay device 33 in FIG. 3. To the first behavior calculator 63, a simulation function of the VDC controller 13 is added. However, the first behavior calculator 63 may be basically similar to the behavior calculator 34 in FIG. 3. For example, the first behavior calculator 63 acquires the vehicle external detection information outputted by a first vehicle external detection controller 121 to the main in-vehicle network 31, and carries out calculation processing. The simulation function of the VDC controller 13 is described later.

Moreover, to the main in-vehicle network 31, other devices than at least the VDC controller 13 as the evaluation target here and the braking actuator 23 may be coupled, out of the devices in the control system 10 of the automobile in FIG. 1. Here, as to the main in-vehicle network 31, the first vehicle external detection controller 121 and the operation controller 11 are given as examples. Furthermore, to the first vehicle external detection controller 121, the compound-eye vehicle external camera 22 is coupled. To the operation controller 11, the operation member 21 is coupled. Here, as with FIG. 3, the first vehicle external detection controller 121 may be that which is similar to the vehicle external detection controller 12 in FIG. 1.

The sub-simulator 602 includes a sub-in-vehicle network 64, a sub-communication network 65, a second synchronous relay device 66, and a second behavior calculator 67. To the sub-communication network 65, a second synchronous relay device 66 and a second behavior calculator 67 are coupled. Here, to the second synchronous relay device 66, the second inter-device relay 71 is added. However, basically, the second synchronous relay device 66 may be that which is similar to the synchronous relay device 33 in FIG. 3. The second behavior calculator 67 generates insufficient information in the inputted information to the VDC controller 13 of the sub-simulator 602. However, basically, the second behavior calculator 67 may be that which is similar to the behavior calculator 34 in FIG. 3. The calculation of the insufficient inputted information regarding the VDC controller 13 is described later.

To the sub-in-vehicle network 64, the first vehicle external detection controller 121 is coupled together with the VDC controller 13 as the evaluation target and the braking actuator 23, in the control system of the automobile in FIG. 1. The first vehicle external detection controller 121 operates in cooperation with the VDC controller 13. To the VDC controller 13, the braking actuator 23 is coupled. Moreover, the device verifier 90 is provided for the VDC controller 13 and the braking actuator 23.

The first inter-device relay 70 outputs, to the second inter-device relay 71, information acquirable for the first synchronous relay device 61 from the main in-vehicle network 31 and the main communication network 32. At this occasion, the first inter-device relay 70 may perform filtering processing on the information acquirable for the first synchronous relay device 61, and output a part of the information to the second inter-device relay 71. Furthermore, the first inter-device relay 70 may output information inputted from the second inter-device relay 71, to the main in-vehicle network 31 or the main communication network 32 through the first synchronous relay device 61.

The second inter-device relay 71 outputs, to the first inter-device relay 70, information acquirable for the second synchronous relay device 66 from the sub-in-vehicle network 64 and the sub-communication network 65. At this occasion, the second inter-device relay 71 may perform filtering processing on the information acquirable for the second synchronous relay device 66, and output a part of the information to the first inter-device relay 70. Furthermore, the second inter-device relay 71 may output information inputted from the first inter-device relay 70, to the sub-in-vehicle network 64 or the sub-communication network 65 through the second synchronous relay device 66.

Thus, the first inter-device relay 70 and the second inter-device relay 71 control transmission and reception of information between the main simulator 601 and the sub-simulator 602. The main simulator 601 is configured to acquire insufficient information for its control, from the sub-simulator 602 through the inter-device relay device by the first inter-device relay 70 and the second inter-device relay 71. The sub-simulator 602 is configured to acquire insufficient information for its control, from the main simulator 601 through the inter-device relay device by the first inter-device relay 70 and the second inter-device relay 71. For example, the second behavior calculator 67 is configured to acquire information necessary for its calculation from the main simulator 601. The contents of the information to be transmitted and received between the main simulator 601 and the sub-simulator 602 are described later.

As described, in the simulation system 60 in FIG. 5, to the main in-vehicle network 31, at least one controller is coupled that outputs the first output to the controller as the evaluation target. Moreover, in the main simulator 601, a closed loop corresponding to the closed loop L1 in FIG. 2 is realized by the devices indicated by the thick-bordered boxes in FIG. 5. That is, in FIG. 5, the closed loop includes the monitor image generator 35, the camera image generator 36, the compound-eye monitor-for-camera 37, the compound-eye vehicle external camera 22, the first vehicle external detection controller 121, and the first behavior calculator 63. It is possible for the first vehicle external detection controller 121 to operate reliably in an environment simulating the control system 10 of the automobile, in an environment that is not influenced by the operation of the VDC controller 13 as the evaluation target, and in the state that the automobile is traveling in the virtual space.

Moreover, in the simulation system 60 in FIG. 5, the VDC controller 13 as the evaluation target is coupled to the sub-in-vehicle network 64 of the sub-simulator 602, to keep the VDC controller 13 outside the closed loop described above. Moreover, the vehicle external detection controller 12 to be used in the evaluation together with the VDC controller 13 as the evaluation target is provided in both the main simulator 601 and the sub-simulator 602. The first vehicle external detection controller 121 as the vehicle external detection controller 12 of the main simulator 601 is inside the closed loop.

In contrast, the second vehicle external detection controller 122 as the vehicle external detection controller 12 of the sub-simulator 602 is outside the closed loop, as with the VDC controller 13 as the evaluation target. However, because the second vehicle external detection controller 122 is supplied with the same parallax image as that of the first vehicle external detection controller 121, the second vehicle external detection controller 122 is basically configured to carry out the similar control operation to the first vehicle external detection controller 121. The second vehicle external detection controller 122 is configured to generate information (vehicle external detection information) equivalent to the vehicle external detection information to be generated by the first vehicle external detection controller 121 that operates in the closed loop, and output the generated information to the sub-in-vehicle network 64.

Here, the second vehicle external detection controller 122 needs, for its operation, the vehicle external image by the compound-eye vehicle external camera 22. Accordingly, in the simulation system 60 in FIG. 5, the compound-eye vehicle external camera 22 to be provided in the main simulator 601 is coupled by a direct line 69 to the second vehicle external detection controller 122 of the sub-simulator 602. This makes it possible for the second vehicle external detection controller 122 to detect information regarding a detection target such as an obstacle-to-travel, in parallel with the first vehicle external detection controller 121, and generate the vehicle external detection information regarding the detection target. The information regarding the detection target is generated for the first vehicle external detection controller 121 by the camera image generator 36 of the main simulator 601. Moreover, it is possible for the second vehicle external detection controller 122 to output the vehicle external detection information to the sub-in-vehicle network 64.

In addition, for example, the first vehicle external detection controller 121 may output the vehicle external image by the compound-eye vehicle external camera 22 to the main in-vehicle network 31. Furthermore, the vehicle external image by the compound-eye vehicle external camera 22 may be relayed from the main simulator 601 to the sub-simulator 602. In this case, it is possible for the second vehicle external detection controller 122 to acquire the vehicle external image by the compound-eye vehicle external camera 22 of the main simulator 601, carry out desired control operation, and output the vehicle external detection information.

Moreover, in the simulation system 60 in FIG. 5, by coupling the first vehicle external detection controller 121 to the main in-vehicle network 31, it is possible to allow the first vehicle external detection controller 121 to operate in the environment simulating the control system 10 of the automobile, and allow the first vehicle external detection controller 121 to output the vehicle external detection information as the first output.

Furthermore, in the simulation system 60 in FIG. 5, by coupling the VDC controller 13 to the sub-in-vehicle network 64, it is possible to allow the VDC controller 13 to operate in the environment simulating the control system 10 of the automobile.

Here, at least the sub-in-vehicle network 64 out of the main in-vehicle network 31 and the sub-in-vehicle network 64 may be the same as the in-vehicle network 16 to be actually used together with the VDC controller 13 in the automobile. However, the main in-vehicle network 31 does not have to be the same as the in-vehicle network 16 to be used in the control system 10 of the automobile, but may be that which is equivalent to the in-vehicle network 16 to be used in the control system 10 of the automobile. In particular, when the evaluation of the vehicle external detection controller 12 to be used as the first vehicle external detection controller 121 has been finished, the main in-vehicle network 31 does not have to be the same as the in-vehicle network 16 to be actually used together with the VDC controller 13 in the automobile.

Here, description is given of the information the VDC controller 13 needs in the predetermined control operation.

As illustrated in FIG. 1, when the VDC controller 13 makes the control of the automatic braking, the VDC controller 13 needs, for example, the information from the detection controller 15, e.g., the speed of the automobile, the acceleration rate of the automobile, and the wheel speeds, in addition to the vehicle external detection information from the vehicle external detection controller 12.

The VDC controller 13 controls an amount of operation and an operation state of the braking actuator 23 when performing the automatic braking, in accordance with information for VDC such as the speed of the automobile, the acceleration rate of the automobile, and the wheel speeds. The VDC controller 13 controls the amount of operation and the operation state of the braking actuator 23 in the automatic braking, to allow the automobile to stop within a distance to the detected obstacle-to-travel. Moreover, when a difference in a distance of instantaneous movement to be obtained from the wheel speeds is large with respect to the distance of instantaneous movement to be obtained from the speed of the automobile in braking, the VDC controller 13 may also make an adjustment control to suppress the operation of the braking actuator 23 and operation of an unillustrated ABS (Anti lock Brake System) device.

In this case, the first inter-device relay 70 to be provided in the first synchronous relay device 61 makes selection, by predetermined filtering processing, from the vehicle external detection information from the vehicle external detection controller 12, and the information regarding the speed and the acceleration rate of the automobile to be obtained as a calculation result of the first behavior calculator 63. The vehicle external detection information from the vehicle external detection controller 12, and the information regarding the speed and the acceleration rate of the automobile to be obtained as the calculation result of the first behavior calculator 63 are generated in the main simulator 601 in which the vehicle external detection controller 12 operates. Moreover, the first inter-device relay 70 outputs selected pieces of the information to the second inter-device relay 71 to be provided in the second synchronous relay device 66. The second synchronous relay device 66 may output the information acquired from the main simulator 601 to the sub-communication network 65 and the sub-in-vehicle network 64.

Moreover, in the sub-simulator 602, the second behavior calculator 67 that operates together with the VDC controller 13 calculates the wheel speeds in the automobile in which the VDC controller 13 is provided, based on the information regarding the speed and the like obtained from the main simulator 601. The second behavior calculator 67 outputs the generated information regarding the wheel speeds of the automobile to the sub-communication network 65. The second synchronous relay device 66 acquires the information regarding the wheel speeds from the sub-communication network 65 and outputs the information to the sub-in-vehicle network 64.

This makes it possible for the second behavior calculator 67 to generate the insufficient information in the information the VDC controller 13 needs in its control of the automatic braking. It is possible for the second behavior calculator 67 to serve as a travel information calculator for the VDC controller 13 as the evaluation target.

Moreover, it is possible for the VDC controller 13 coupled to the sub-in-vehicle network 64 to acquire the vehicle external detection information by the first vehicle external detection controller 121 operating in the closed loop of the main simulator 601, or the vehicle external detection information equivalent thereto by the second vehicle external detection controller 122 operating in the sub-simulator 602. Moreover, as with the case in FIG. 1, it is possible for the VDC controller 13 to acquire all the information necessary for the control operation for the automatic braking from the sub-in-vehicle network 64.

It is to be noted that, in the simulation system 60 in FIG. 5, the devices in FIG. 1 are incorporated to evaluate the control operation for the automatic braking with respect to the devices of the control system 10 to be provided in the automobile.

When evaluating the control operation for other functions of the automobile, the various devices of the control system 10 of the automobile to be incorporated in the simulation system 60 in FIG. 5 may be modified from those in FIG. 5.

Moreover, when evaluating the control operation for each function of the automobile, all the devices of the control system 10 of the automobile may be incorporated in the simulation system 60 in FIG. 5.

Figure 6:
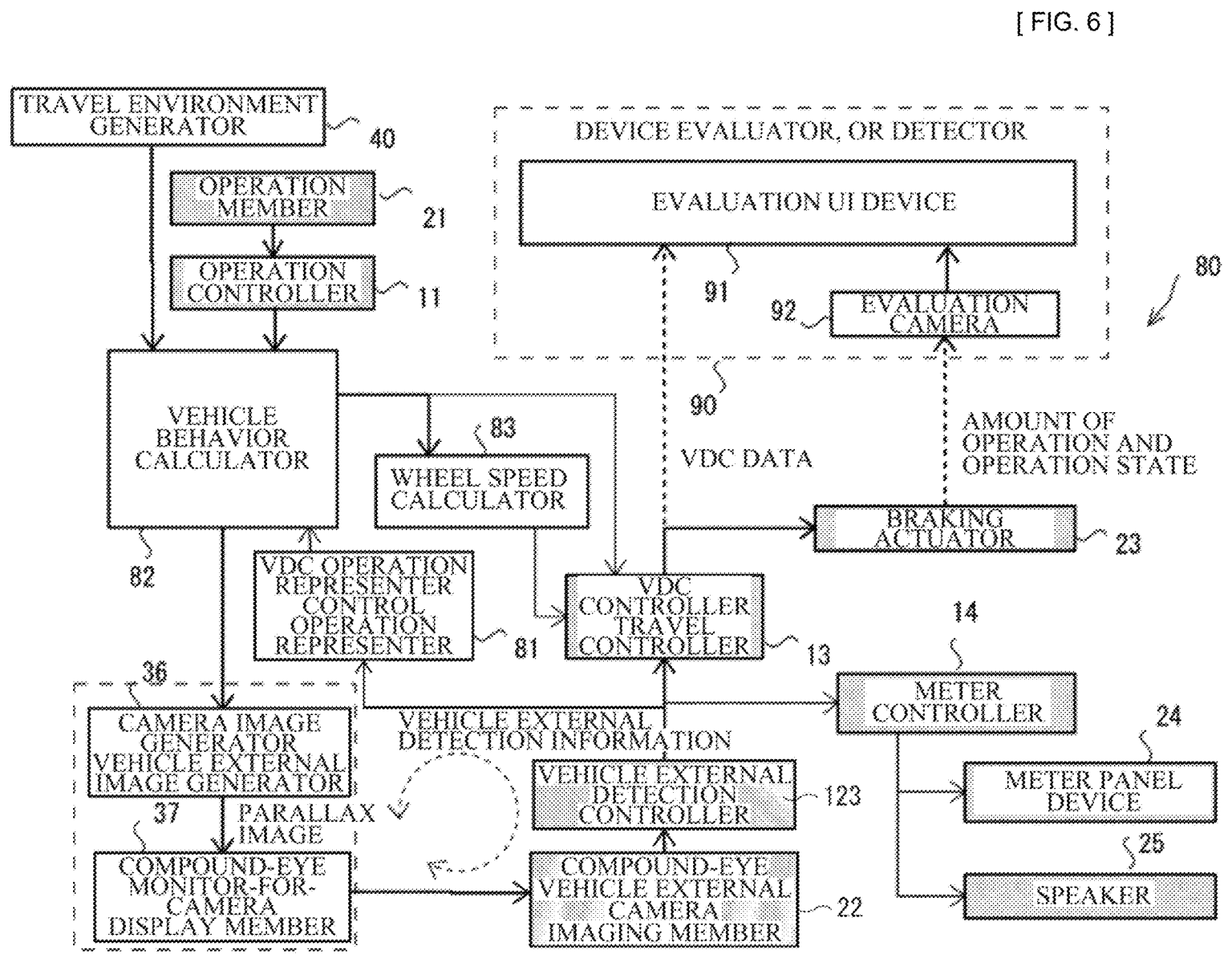

FIG. 6 is a block diagram of a simulation system 80 to be realized in the basic configuration in FIG. 5 for evaluation of an automobile.

FIG. 6 illustrates a VDC operation representer 81 as a control operation representer, a vehicle behavior calculator 82, and a wheel speed calculator 83, as the configuration of the simulation system 80, together with the basic constituent elements in FIG. 5.

The hatched boxes in the figure are the various devices illustrated in the control system 10 of the automobile in FIG. 1 and provided in the simulation system 60 in FIG. 5.

FIG. 6 illustrates the meter controller 14 together with the VDC controller 13 coupled to the sub-in-vehicle network 64.

Upon acquiring a significant piece of the vehicle external detection information, the VDC controller 13 makes the control for the automatic braking and outputs the VDC data to the braking actuator 23. This makes it possible for the automobile traveling in the virtual space to decelerate in the virtual space and eventually stop.

Upon acquiring the significant piece of the vehicle external detection information, the meter controller 14 outputs an alert to the meter panel 24 and outputs an alert sound from the speaker 25. This makes it possible for the occupant of the automobile to recognize the obstacle-to-travel.

The VDC operation representer 81 represents a control output of the VDC controller 13 or an operation output of the actuator in accordance with the vehicle external detection information outputted from a vehicle external detection controller 123 in FIG. 6.

Here, it suffices that the VDC operation representer 81 represents, for example, an input and an output to or from the VDC controller 13, or represents an input and an output to or from an entirety of the VDC controller 13 and the actuator.

For example, each controller to be provided in the control system 10 of the automobile is developed through processes such as input/output design, requirement design, and functional design of each controller based on requested specifications of the entire automobile. In this case, at timing when a controller for evaluation is created, the input/output design, the requirement design, the function design, and the like with respect to the relevant controller have been finished. Based on information regarding these pre-existing designs, it is possible to easily model the input and the output to or from the VDC controller 13, and the input and the output to or from the entirety of the VDC controller 13 and the actuator. Moreover, there is high possibility that each manufacturer has already developed similar kinds of the controllers. In this case, it is also possible to model the controllers that have already been developed. Based on these models, the VDC operation representer 81 may represent the input and the output to or from the VDC controller 13, or the input and the output to or from the entirety of the VDC controller 13 and the actuator.

The vehicle behavior calculator 82 calculates the behavior of the automobile that is variable with the operation of the braking actuator 23, and the travel state of the automobile by using, for example, an output of the VDC operation representer 81.

The wheel speed calculator 83 calculates the wheel speeds of the automobile based on, for example, the speed of the automobile. The wheel speeds of the automobile take different values in accordance with, for example, circumferential lengths of the wheels of the automobile even if the speed of the automobile is the same.

Moreover, in FIG. 6, the closed loop of the main simulator 601 in FIG. 5 includes the unillustrated monitor image generator 35, the camera image generator 36, the compound-eye monitor-for-camera 37, the compound-eye vehicle external camera 22, the vehicle external detection controller 123, the VDC operation representer 81, and the vehicle behavior calculator 82.

In this case, the camera image generator 36 and the monitor image generator 35 serve as a vehicle external image generator that generates the vehicle external image in the travel state of the automobile that is variable with the operation of the actuator, by using a calculation result of the vehicle behavior calculator 82.

The compound-eye monitor-for-camera 37 serves as a display member that displays the vehicle external image generated by the camera image generator 36.

The compound-eye vehicle external camera 22 serves as an imaging member that captures the vehicle external image displayed by the display member and outputs the captured image to the vehicle external detection controller 123 as the captured vehicle external image.

Here, the VDC operation representer 81 and the vehicle behavior calculator 82 are realized in the first behavior calculator 63 of the main simulator 601 in FIG. 5. Thus, the first behavior calculator 63 in FIG. 5 calculates the behavior of the automobile including the control operation of the VDC controller 13 as the evaluation target. The first behavior calculator 63 may carry out calculation processing as the VDC operation representer 81 based on, for example, a mathematical expression or a table indicating input/output relation of the VDC controller 13 as the evaluation target, and calculate the behavior of the automobile by the VDC controller 13. Moreover, the first behavior calculator 63 may calculate the behavior of the entire automobile and the travel state of the automobile after the behavior, by using the calculation result of the behavior of the automobile as the VDC operation representer 81.

Moreover, the wheel speed calculator 83 is realized in the second behavior calculator 67 of the sub-simulator 602 in FIG. 5. The second behavior calculator 67 acquires, through the sub-communication network 65, the information such as the speed indicating the behavior of the automobile calculated by the first behavior calculator 63 or the travel state of the automobile in accordance with the behavior. The second behavior calculator 67 calculates, as the wheel speed calculator 83, information to be inputted to the VDC controller 13 in accordance with the information to be acquired, e.g., the speed. The second behavior calculator 67 outputs the calculation result as the wheel speed calculator 83 to the sub-communication network 65. The second synchronous relay device 66 outputs the calculation result of the wheel speed calculator 83 outputted to the sub-communication network 65, to the VDC controller 13 through the sub-in-vehicle network 64.

Moreover, the vehicle external detection controller 123 in FIG. 6 corresponds to both the first vehicle external detection controller 121 of the main simulator 601 in FIG. 5 and the second vehicle external detection controller 122 of the sub-simulator 602. The second vehicle external detection controller 122 is configured to operate similarly to the first vehicle external detection controller 121. That is, in FIG. 6, the vehicle external detection information by the vehicle external detection controller 123 is outputted to the VDC operation representer 81 and the VDC controller 13.

Thus, the vehicle external detection controller 123 in FIG. 6 operates in the closed loop that generates the travel state of the automobile.

Furthermore, the vehicle external detection controller 123 in FIG. 6 that operates in the closed loop is configured to output the generated vehicle external detection information to the VDC controller 13 that is not included in the closed loop.

The device verifier 90 in FIG. 6 includes an evaluation UI device 91 and an evaluation camera 92 coupled to the evaluation UI device 91.

The evaluation camera 92 detects the operation of the braking actuator 23 by imaging. For example, in a hydraulic braking device, a brake pad is pressed against a brake disc by hydraulic pressure to generate a braking force. The evaluation camera 92 may capture a change in an oil level caused by the hydraulic pressure. This makes it possible for the evaluation camera 92 to detect the amount of operation and the operation state of the braking actuator 23 the operation of which is controlled by the VDC controller 13, based on the position of the oil level and the change in the oil level by the operation of the braking actuator 23.

The evaluation UI device 91 may be, for example, a device in which a monitor as a user interface or the like is added to the computer device 50 in FIG. 4. In this case, the evaluation UI device 91 may display, on the monitor, a captured image of the oil level captured by the evaluation camera 92. By the display on the monitor, it is possible for the developer to check the amount of operation and the operation state of the braking actuator 23. Moreover, the evaluation UI device 91 may hold master data regarding the change in the oil level in accordance with, for example, a scenario in the simulation system 80, and display a comparison result with the master data on the monitor.

As described, in the simulation system 80 in FIG. 6, it is possible to allow the vehicle external detection controller 123 to operate in the closed loop that does not include the VDC controller 13 as the evaluation target. Moreover, in the simulation system 80 in FIG. 6, it is possible to output the vehicle external detection information as the first output of the vehicle external detection controller 123 operating in such a closed loop, to the VDC controller 13 as the evaluation target outside the closed loop.

Furthermore, the device verifier 90 is configured to observe, by the evaluation camera 92, the operation state of the braking actuator 23 the operation of which is controlled by the VDC controller 13 as the evaluation target, and provide the operation state of the braking actuator 23 to the developer. Thus, when the change in the oil level in accordance with, for example, the scenario in the simulation system 80 is not desirable, it is possible for the developer to easily check up and start the correction work. In addition, because the simulation system 80 in FIG. 6 is based on the simulation system 60 in FIG. 5, it is possible to retain, in the system, various kinds of information during execution of the scenario. Accordingly, as an evaluation result, it is possible to obtain richer information than in the case of evaluation with an actual vehicle. By analyzing the information, it is possible for the developer to easily determine, based on the evaluation result, points that cause a failure in a desired result, and points that should be corrected therefor. When the evaluation result is not good, it is possible for the developer to easily and reliably determine whether the cause lies in the vehicle external detection controller 12 or whether the cause lies in the VDC controller 13.

It is to be noted that, in the forgoing description as to FIG. 6, the wheel speed calculator 83 is realized in the second behavior calculator 67 of the sub-simulator 602 in FIG. 5.

In addition, for example, the wheel speed calculator 83 may be realized in the first behavior calculator 63 of the main simulator 601 in FIG. 5.

In this case, the information the VDC controller 13 needs to acquire for the control for the automatic braking other than the vehicle external detection information generated by the vehicle external detection controller 123 is all generated by the main simulator 601 and relayed to the sub-simulator 602.

FIG. 7 is a schematic illustrative diagram to illustrate operation timing of the basic simulation system 60 in FIG. 5, in the simulation system 80 in FIG. 6.

FIG. 7 illustrates the information to be generated by the main simulator 601 and the information to be generated by the sub-simulator 602 in order from the upper side of the figure. Specifically, as the information by the main simulator 601, the vehicle external detection information as an output of the first vehicle external detection controller 121 in the main simulator 601, the VDC data as the output of the VDC operation representer 81, and the parallax image to be generated by the camera image generator 36 are illustrated. As the information by the sub-simulator 602, the vehicle external detection information as an output of the second vehicle external detection controller 122 in the sub-simulator 602 and the VDC data as the output of the VDC controller 13 are illustrated. The VDC data as the output of the VDC controller 13 is outputted to the braking actuator 23.

Moreover, in FIG. 7, time flows from the left to the right.

As illustrated in FIG. 7, in a time slot at the time t1, in the main simulator 601, the first vehicle external detection controller 121 outputs the vehicle external detection information as the first output. The VDC operation representer 81 outputs the VDC data. The camera image generator 36 generates the parallax image.

In a time slot at the time t2, in the main simulator 601, the first vehicle external detection controller 121 outputs the vehicle external detection information based on the parallax image based on the processing at the time t1. The VDC operation representer 81 outputs the VDC data. The camera image generator 36 generates the parallax image.

In a time slot at the time t3, in the main simulator 601, the first vehicle external detection controller 121 outputs the vehicle external detection information based on the parallax image based on the processing at the time t2. The VDC operation representer 81 outputs the VDC data. The camera image generator 36 generates the parallax image.

While such a control is carried out in the main simulator 601, the sub-simulator 602 also performs a control.

That is, in the time slot at the time t1, the second vehicle external detection controller 122 of the sub-simulator 602 outputs the vehicle external detection information based on the parallax image generated in the main simulator 601. The VDC controller 13 outputs the VDC data to the braking actuator 23.

In the time slot at the time t2, the second vehicle external detection controller 122 of the sub-simulator 602 outputs the vehicle external detection information based on the parallax image based on the processing at the time t1 generated in the main simulator 601. The VDC controller 13 outputs the VDC data to the braking actuator 23.

In the time slot at the time t3, the second vehicle external detection controller 122 of the sub-simulator 602 outputs the vehicle external detection information based on the parallax image based on the processing at the time t2 generated in the main simulator 601. The VDC controller 13 outputs the VDC data to the braking actuator 23.

As described, the main simulator 601 and the sub-simulator 602 are configured to carry out the control operation on each cycle of the time slots defined in the in-vehicle network 16. In the basic simulation system 60 in FIG. 5, the main simulator 601 and the sub-simulator 602 are configured to operate synchronously in accordance with the cycles of the time slots defined in the in-vehicle network 16. For example, in the automobile, the second vehicle external detection controller 122 and the VDC controller 13 are configured to input and output the vehicle external detection information as the first output by using the time slots allocated for periodic communication through the in-vehicle network 16.

Moreover, in the case in FIG. 7, a cycle Tc0 of the control operation of the simulation systems 60 and 80, a cycle Tc1 of the control operation of the main simulator 601, and a cycle Tc2 of the control operation of the sub-simulator 602 are the same. The cycles of the control operation may basically be the same as a control cycle in the automobile as the evaluation target.

In contrast, the camera image generator 36 that outputs the information regarding the detection target to the first vehicle external detection controller 121 and the second vehicle external detection controller 122 updates the parallax image to be outputted to the compound-eye monitor-for-camera 37 for each cycle Tc3 shorter than the control cycles Tc0 to Tc2 of these time slots. In FIG. 7, the parallax image is updated about three times in each control cycle Tc0, Tc1, or Tc2 for one time slot. In this case, the update cycle Tc3 of the parallax image is a short cycle of about ⅓ of the control cycles Tc0 to Tc2 of the time slots.

Thus, it is possible for the camera image generator 36 to update the parallax image as soon as the VDC data is updated in each cycle Tc1. It is possible for the camera image generator 36 to update the parallax image to be outputted on each control cycle of the time slots.

It is possible for the first vehicle external detection controller 121 and the second vehicle external detection controller 122 to detect the information regarding the detection target that is updatable on shorter cycles than their operation cycles. That is, because the detection target is updatable on shorter cycles than those of the time slots, it is possible for each of the first vehicle external detection controller 121 and the second vehicle external detection controller 122 to operate at similar timing to a case where they operate in an automobile.

It is to be noted that, as illustrated in FIG. 5, the first vehicle external detection controller 121 and the second vehicle external detection controller 122 are coupled to the same compound-eye vehicle external camera 22, and possibly supplied with the same vehicle external image. Accordingly, the vehicle external detection information to be outputted from the first vehicle external detection controller 121 and the vehicle external detection information to be outputted from the second vehicle external detection controller 122 may be possibly the same.

Accordingly, in the time slots of the same timing vertically corresponding in FIG. 7, the vehicle external detection information in the main simulator 601 and the vehicle external detection information in the sub-simulator 602 are also expected to be the same.

Similarly, the VDC data to be generated based on the same vehicle external detection information is also expected to be the same, with respect to the main simulator 601 and the sub-simulator 602.

As a result, although the braking actuator operates by the input of the VDC data by the VDC controller 13 in the sub-simulator 602, it is possible to regard the control actuator as operating by the VDC data by the main simulator 601 making a closed-loop control.

FIG. 8 is a flowchart illustrating an overall control flow for evaluation of the automatic braking in the simulation systems 60 and 80 of the embodiment.

The simulation system 60 in FIG. 5 and the simulation system 80 in FIG. 6 are configured to make a control based on, for example, a predetermined travel scenario of the automobile, to evaluate the automatic braking. Here, an example of such a travel scenario is described. The flowchart in FIG. 8 may be executed by the devices constituting the simulation systems 60 and 80 in cooperation with one another.

Moreover, here, the flowchart in FIG. 8 is described, giving as an example a case where the first behavior calculator 63 of the main simulator 601 allows the automobile to travel in the virtual space in accordance with the travel scenario. It is to be noted that the automobile is also configured to travel in the virtual space in accordance with the operation on the operation member 21 by the driver.

It is to be noted that such a travel scenario may basically include information for the automobile to travel from an initial position to an end position in the virtual space. The information in the travel scenario may include similar information to that which is outputted by the operation controller 11 to the main in-vehicle network 31 when, for example, the driver makes the operation on the operation member 21 to allow the automobile to travel in the virtual space.

In step ST1 in FIG. 8, the simulation systems 60 and 80 output an initial travel state. For example, the event generator 39 outputs a start event of the travel scenario. The travel environment generator 40 generates the virtual space at the initial position of the automobile in the travel scenario. The first behavior calculator 63 generates information for the automobile to start traveling from the initial position in accordance with the travel scenario. The information for the start of the travel to be generated here may be similar to that which is outputted by the operation control member to the in-vehicle network 16 when, for example, the driver makes the operation on the operation member 21 to start the travel of the automobile.

In step ST2, the first behavior calculator 63 calculates the behavior of the automobile and the travel state after the behavior, based on the information for the start of the travel generated by itself. The first inter-device relay 70 provided in the first synchronous relay device 61 acquires, from the main communication network 32, the information regarding the speed and the acceleration rate of the automobile as the information regarding the travel state after the behavior, and outputs the information to the second inter-device relay 71 provided in the second synchronous relay device 66.

In step ST3, the monitor image generator 35 generates the visual field image from the automobile with reference to the position of the automobile after the behavior, and the camera image generator 36 further generates the parallax image. The compound-eye monitor-for-camera 37 displays the parallax image after the behavior.

In step ST4, the compound-eye vehicle external camera 22 captures the parallax image after the behavior displayed on the compound-eye monitor-for-camera 37.

In step ST5, the first vehicle external detection controller 121 analyzes the vehicle external image captured by the compound-eye vehicle external camera 22, and outputs the vehicle external detection information to the main in-vehicle network 31.

Moreover, the first synchronous relay device 61 acquires the vehicle external detection information from the main in-vehicle network 31 and outputs the vehicle external detection information to the main communication network 32.

Furthermore, the first inter-device relay 70 provided in the first synchronous relay device 61 acquires the vehicle external detection information from the main in-vehicle network 31, and outputs the vehicle external detection information to the second inter-device relay 71 provided in the second synchronous relay device 66. The second synchronous relay device 66 outputs the vehicle external detection information acquired from the main simulator 601 to the sub-in-vehicle network 64.

Here, when no obstacles-to-travel are present in the direction of advance of the automobile in the virtual space, the first vehicle external detection controller 121 may output an insignificant piece of the vehicle external detection information, or alternatively, the first vehicle external detection controller 121 does not have to output any vehicle external detection information. In such a case, the simulation systems 60 and 80 do not carry out processes of steps ST6 to ST8.

In contrast, for example, when the travel scenario advances to some extent and an obstacle-to-travel is present in the direction of advance of the automobile in the virtual space, the simulation systems 60 and 80 carry out the processes of steps ST6 to ST8. Details are described later.

In step ST9, the first behavior calculator 63 calculates the current behavior and the current travel state of the automobile by using the previous behavior and the previous travel state of the automobile immediately before and the information newly acquired from the main communication network 32. At this occasion, when an obstacle-to-travel is present in the direction of advance of the automobile in the virtual space, and a significant piece of the vehicle external detection information has been generated, the first behavior calculator 63 first carries out calculation processing as the VDC operation representer 81 based on the vehicle external detection information. Thereafter, the first behavior calculator 63 calculates the behavior and the travel state of the automobile after VDC operation. Thus, the travel state of the automobile is updated.

In step ST10, the simulation systems 60 and 80 determine whether to start the evaluation of the automatic braking. The determination in step ST10 may be made by, for example, the first behavior calculator 63. The first behavior calculator 63 may determine whether to start the evaluation of the automatic braking based on, for example, whether the speed of the automobile traveling in the virtual space is a speed suitable for the evaluation of the automatic braking. When the evaluation of the automatic braking is not to be started, the first behavior calculator 63 causes the processing to return to step ST1. The simulation systems 60 and 80 including the first behavior calculator 63 repeat the processes of steps ST1 to ST10 until it is determined in step ST10 that the evaluation of the automatic braking is to be started. Thus, when it is determined in step ST10 that the evaluation of the automatic braking is to be started, the simulation systems 60 and 80 including the first behavior calculator 63 cause the processing to proceed to step ST11.

In step ST11, the simulation systems 60 and 80 output an evaluation event. The event generator 39 outputs the obstacle-to-travel, frontward in the direction of advance of the automobile in the virtual space. The travel environment generator 40 generates the virtual space including the obstacle-to-travel, as the virtual space at a current position of the automobile. The monitor image generator generates the visual field image from the automobile with reference to the current position of the automobile, and the camera image generator 36 further generates the parallax image. Thus, the compound-eye monitor-for-camera 37 displays the parallax image including an image of the obstacle-to-travel. As a result, in step ST5, the first vehicle external detection controller 121 analyzes the vehicle external image captured by the compound-eye vehicle external camera 22, and outputs a significant piece of the vehicle external detection information to the main in-vehicle network 31. Moreover, the second vehicle external detection controller 122 also analyzes the vehicle external image captured by the compound-eye vehicle external camera 22 and outputs a significant piece of the vehicle external detection information to the sub-in-vehicle network 64. In this case, the simulation systems 60 and 80 carry out the processes of steps ST6 to ST8.

In step ST6, the VDC controller 13 of the sub-simulator 602 acquires, from the sub-in-vehicle network 64, the vehicle external detection information outputted by the second vehicle external detection controller 122 to the sub-in-vehicle network 64, and carries out a braking control for the automatic braking. The VDC controller 13 generates the VDC data corresponding to, for example, the wheel speeds, the speed, and the acceleration rate of the automobile, and outputs the VDC data to the braking actuator 23.

In step ST7, the braking actuator 23 performs the braking operation for the automatic braking. In step ST8, the evaluation camera 92 captures the change in the oil level based on the operation of the braking actuator 23. The captured image by the evaluation camera 92 is outputted to the evaluation UI device 91 and displayed on the monitor of the evaluation UI device 91. In this way, it is possible for the developer to check, in the evaluating UI device 91, the control for the automatic braking and a result of the operation during the travel in the virtual space in accordance with the travel scenario.

In step ST12, the simulation systems 60 and 80 determine whether to end the evaluation of the automatic braking. The determination in step ST12 may be made by, for example, the first behavior calculator 63. The first behavior calculator 63 may determine the end of the evaluation of the automatic braking when, for example, the speed of the automobile traveling in the virtual space is a speed sufficiently reduced to 0 km/h or close to 0 km/h by the automatic braking. When it is not determined that the evaluation of the automatic braking is to be ended, the first behavior calculator 63 causes the processing to return to step ST2. After it is determined in step ST10 that the evaluation of the automatic braking is to be started, the simulation systems 60 and 80 including the first behavior calculator 63 repeat the processes of steps ST2 to ST12 until it is determined in step ST12 that the evaluation of the automatic braking is to be ended. Thus, when it is determined in step ST12 that the evaluation of the automatic braking is to be ended, the simulation systems 60 and 80 including the first behavior calculator 63 cause the processing to proceed to step ST13.

In step ST13, the simulation systems 60 and 80 evaluate the evaluation result. Each device of the simulation systems 60 and 80 may output various kinds of data acquired during the evaluation to, for example, the evaluation UI device 91 through an unillustrated communication network, and record the data in, for example, the evaluation UI device 91. This makes it possible for the developer to comprehensively evaluate, with the evaluation UI device 91, the control operation for the automatic braking based on the travel scenario, inclusive of the operation of the braking actuator 23. Moreover, it is possible for the developer to promptly identify a target that should be corrected, based on the evaluation result, and correct the VDC controller 13 as the evaluation target, or correct the vehicle external detection controller 12 to be used therewith.

As described, by making the evaluation control in FIG. 8 based on the travel scenario, it is possible for the simulation systems 60 and 80 to allow the VDC controller 13 as the evaluation target to make the control to allow the braking actuator 23 to operate. Moreover, it is possible for the developer or the like to check the evaluation result in the evaluation UI device 91 or the like. Furthermore, the simulation systems 60 and 90 are configured to acquire the VDC data as the output of the VDC controller 13 together with the change in the oil level based on the operation of the braking actuator 23. In addition, the simulation systems 60 and 80 are also configured to acquire information under evaluation with respect to the output of the second vehicle external detection controller 122 that operates together with the VDC controller 13 on the occasion of the evaluation of the automatic braking, and the output of the first vehicle external detection controller 121 that outputs that which is equivalent thereto. By comparing these pieces of information in the evaluation of the automatic braking, it is possible for the developer to easily grasp which device to be corrected to obtain a desired result and the contents of the correction.

It is to be noted that, in FIG. 8, the evaluation is made by the simulation systems 60 and 80 executing the travel scenario. As with the simulation system 30 in FIG. 3, the simulation systems 60 and 90 are configured to be operated by the driver with the main simulator 601. The simulation systems 60 and 80 may execute the travel scenario and make the evaluation by the driver making the operation on the operation member 21 in accordance with the predetermined travel scenario.

As described above, in the embodiment, as illustrated in FIG. 6, the vehicle external
detection controller 12 that outputs the information to the VDC controller 13 as a verification target in the automobile operates in the closed loop of the VDC operation representer 81, the vehicle behavior calculator 82, the camera image generator 36, the compound-eye monitor-for-camera 37, and the compound-eye vehicle external camera 22. The vehicle external detection controller 12 is configured to operate in the closed loop that generates the travel state of the automobile. Moreover, this closed loop does not include the VDC controller 13 as the verification target. This makes it possible for the closed loop to reliably generate the travel state of the automobile. It is possible for the vehicle external detection controller 12 to operate reliably in the travel state of the automobile in the closed loop, without being influenced by the operation of the VDC controller 13 as the verification target.

Moreover, in the embodiment, the vehicle external detection information generated by the vehicle external detection controller 12 that operates in such a closed loop or the information equivalent to the vehicle external detection information generated by the vehicle external detection controller 12 is outputted to the VDC controller 13 that is not included in the closed loop. This makes it possible for the VDC controller 13 to control the operation of the actuator for the travel control of the automobile that possibly changes the behavior of the automobile, in accordance with the vehicle external detection information by the vehicle external detection controller 12 that operates reliably in the travel state of the automobile in the closed loop. It is possible for the VDC controller 13 to operate reliably in the travel state of the automobile in the closed loop. Moreover, for example, when the VDC controller 13 operates reliably in the closed loop but the control of the VDC controller 13 or the operation of the actuator is not desirable, it is possible for the developer to make the correction work on the VDC controller 13 as the verification target or the actuator.

Moreover, in the embodiment, it is also possible to easily make a determination as to the vehicle external detection controller 12 that outputs the vehicle external detection information to the VDC controller 13, based on whether the closed loop operates reliably. It is possible for the developer to obtain, as a verification result, not only a verification result of the VDC controller 13 but also a verification result of the vehicle external detection controller 12 that is allowed to operate together with the VDC controller 13. The developer is less confused in making a determination as to isolation of points that should be corrected.

Moreover, by using the simulation system 80 for the automobile according to the embodiment, it is possible for the developer to verify the VDC controller 13 without incorporating the VDC controller 13 as the verification target in the automobile together with the vehicle external detection controller 12. It is possible for the developer to start, at an early stage, the verification of the VDC controller 13, in combination with the vehicle external detection controller 12, without incorporating the VDC controller 13 in an actual vehicle together with the vehicle external detection controller 12, at a stage where the developments of the automobile has not been advanced, in an environment close to an actual vehicle.

Second Embodiment

Description is given next of a second embodiment of the invention. In the embodiment, the same reference numerals are used for similar configurations to those in the forgoing embodiment, and illustration and description thereof are omitted. Description is mainly given of differences from the forgoing embodiment.

In the embodiment, a case is described in which a disturbance generator 100 to disturb the travel of the automobile is provided in the closed loop of the simulation system 80 in FIG. 6.

FIG. 9 is a block diagram of a simulation system 80 for an automobile, according to a second embodiment of the invention.

The simulation system 80 for the automobile in FIG. 9 is realized in the basic configuration in FIG. 5 for the evaluation of the automobile and corresponds to that in FIG. 6.

Moreover, the simulation system 80 for the automobile in FIG. 9 includes the disturbance generator 100.

The disturbance generator 100 is provided in the compound-eye vehicle external camera 22 included in the closed loop.

In the compound-eye vehicle external camera 22, the disturbance generator 100 adds a disturbance component for an image to the vehicle external image generated by the compound-eye vehicle external camera 22 by imaging. The compound-eye vehicle external camera 22 outputs the vehicle external image to which the disturbance component is added by the disturbance generator 100.

Here, the disturbance component for the image may be, for example, an obstacle-to-travel such as a preceding vehicle or a pedestrian, a traffic signal, a railroad crossing, or the like.

Moreover, the disturbance generator 100 may add the disturbance component for the image to the vehicle external image generated by the compound-eye vehicle external camera 22 by imaging, based on, for example, a disturbance occurrence event generated by the event generator 39 in FIG. 5 based on the travel scenario.

Adding such a disturbance component makes the vehicle external image an image including an image component related to a disturbance to disturb the travel of the automobile.

Moreover, the compound-eye vehicle external camera 22 outputs the vehicle external image including the image component related to the disturbance component to the vehicle external detection controller 123 in FIG. 9.

The vehicle external detection controller 123 analyzes the inputted vehicle external image and extracts an obstacle-to-travel, a traffic signal, a road sign, a railroad crossing, and the like, as with the vehicle external detection controller 12 described above.

When the obstacle-to-travel is located on the course of the subject vehicle at a predetermined distance or less, the vehicle external detection controller 123 outputs a significant piece of the vehicle external detection information regarding the obstacles-to-travel or the like present on the course to the in-vehicle network 16.

This significant piece of the vehicle external detection information is outputted to the VDC operation representer 81, the VDC controller 13, and the meter controller 14.

Thus, the closed loop including the VDC operation representer 81 carries out a loop control to cope with occurrence of the disturbance.

The VDC controller 13 makes the control for the automatic braking and outputs the VDC data to the braking actuator 23. This makes it possible for the automobile traveling in the virtual space to decelerate in the virtual space and eventually stop, by the automatic braking.

The meter controller 14 outputs the alert to the meter panel 24, and outputs the alert sound from the speaker 25. This makes it possible for the occupant of the automobile to recognize the obstacle-to-travel.

As described above, in the embodiment, the disturbance generator 100 is provided in the compound-eye vehicle external camera 22 included in the closed loop, and generates the disturbance in the vehicle external image to be outputted from the compound-eye vehicle external camera 22. This allows the closed loop to make the control to cope with the disturbance. Thus, the VDC controller 13 as the verification target is possibly supplied with the significant piece of the vehicle external detection information to cope with the disturbance generated under the control to cope with the disturbance.

This makes it possible for the VDC controller 13 to generate the VDC data for the automatic braking and output the VDC data to the braking actuator 23. It is possible for the braking actuator 23 to perform the braking operation for the automatic braking under the control of the VDC controller 13.

In the embodiment, it is possible to evaluate the control of the VDC controller 13 and the operation of the braking actuator 23 in the travel environment in which the disturbance occurs.

Third Embodiment

Description is given next of a third embodiment of the invention. In the embodiment, the same reference numerals are used for similar configurations to those in the forgoing embodiment, and illustration and description thereof are omitted. Description is mainly given of differences from the forgoing embodiment.

In the embodiment, a case is described in which a disturbance generator 101 to disturb the travel of the automobile is provided in the closed loop of the simulation system 80 in FIG. 6.

FIG. 10 is a block diagram of a simulation system 80 for an automobile, according to the third embodiment of the invention.

The simulation system 80 for the automobile in FIG. 10 is realized in the basic configuration in FIG. 5 for the evaluation of the automobile and corresponds to that in FIG. 6.

Moreover, in the simulation system 80 for the automobile in FIG. 10, the disturbance generator 101 is provided for the vehicle external detection controller 123 included in the closed loop. As to the simulation system 60 in FIG. 5, the disturbance generator 101 is provided in the first vehicle external detection controller 121 as a part of the vehicle external detection controller 123.

The first vehicle external detection controller 121, as a part of the vehicle external detection controller 123, analyzes the vehicle external image and detects any obstacles-to-travel or the like.

In the first vehicle external detection controller 121, the disturbance generator 101 generates, as the disturbance component, information regarding, for example, an obstacle-to-travel.

Thus, the first vehicle external detection controller 121, as a part of the vehicle external detection controller 123, outputs a significant piece of the vehicle external detection information indicating that an obstacle-to-travel or the like has been detected, even when no obstacles to travel or the like have been detected in the vehicle external image.

Moreover, the first vehicle external detection controller 121, as a part of the vehicle external detection controller 123, outputs the significant piece of the vehicle external detection information to the VDC operation representer 81, the VDC controller 13, and the meter controller 14.

Thus, the closed loop including the vehicle external detection controller 123 carries out the loop control to cope with the occurrence of the disturbance.

The VDC controller 13 carries out the control for the automatic braking and outputs the VDC data to the braking actuator 23. This makes it possible for the automobile traveling in the virtual space to decelerate in the virtual space and eventually stop, by the automatic braking.

The meter controller 14 outputs the alert to the meter panel 24, and outputs the alert sound from the speaker 25. This makes it possible for the occupant of the automobile to recognize the obstacle-to-travel.

As described above, in the embodiment, the disturbance generator 101 is provided in the vehicle external detection controller 123 included in the closed loop, and the vehicle external detection information to be outputted from the vehicle external detection controller 123 is changed by the disturbance from the insignificant one to the significant one. This allows the closed loop to carry out the control to cope with the disturbance. Moreover, the VDC controller 13 as the verification target is possibly supplied with the significant piece of the vehicle external detection information to cope with the disturbance generated under the control to cope with to the disturbance.

This makes it possible for the VDC controller 13 to generate the VDC data for the automatic braking and output the VDC data to the braking actuator 23. It is possible for the braking actuator 23 to perform the braking operation for the automatic braking under the control of the VDC controller 13.

In the embodiment, it is possible to evaluate the control of the VDC controller 13 and the operation of the braking actuator 23 in the travel environment in which the disturbance occurs.

Fourth Embodiment

Description is given next of a fourth embodiment of the invention. In the embodiment, the same reference numerals are used for the similar configurations to those in the forgoing embodiment, and illustration and description thereof are omitted. Description is mainly given of differences from the forgoing embodiment.

In the embodiment, a case is described in which a disturbance generator 102 to disturb the travel of the automobile is provided in the closed loop of the simulation system 80 in FIG. 6.

FIG. 11 is a block diagram of a simulation system 80 for an automobile, according to the fourth embodiment of the invention.

The simulation system 80 for the automobile in FIG. 11 is realized in the basic configuration in FIG. 5 for the evaluation of the automobile and corresponds to that in FIG. 6.

Moreover, in the simulation system 80 for the automobile in FIG. 11, the disturbance generator 102 is provided for the vehicle behavior calculator 82 included in the closed loop. As to the simulation system 60 in FIG. 5, the disturbance generator 102 is provided in the first behavior calculator 63.

The vehicle behavior calculator 82 calculates the behavior of the automobile based on, for example, the VDC data outputted by the VDC operation representer 81.

In the first vehicle external detection controller 121, the disturbance generator 102 may generate the disturbance by, for example, adding the disturbance component to the VDC data to be outputted by the VDC operation representer 81.

Thus, the vehicle behavior calculator 82 calculates the behavior of the automobile based on the VDC data that changes with the disturbance, even when the VDC operation representer 81 outputs the VDC data in a state in which no disturbance occurs.

Moreover, the vehicle behavior calculator 82 outputs the information regarding the behavior of the automobile that changes with the disturbance, and also the information regarding the travel state of the automobile to cope therewith, to the monitor image generator 35 and the camera image generator 36. Thus, the parallax image to be generated by the camera image generator 36 becomes that which copes with the travel state that changes with the disturbance.

The closed loop including the vehicle behavior calculator 82 carries out the loop control to cope with the occurrence of the disturbance.

The VDC controller 13 carries out the control for the automatic braking and outputs the VDC data to the braking actuator 23. This makes it possible for the automobile traveling in the virtual space to decelerate in the virtual space and eventually stop, by the automatic braking.

The meter controller 14 outputs the alert to the meter panel 24, and outputs the alert sound from the speaker 25. This makes it possible for the occupant of the automobile to recognize the obstacle-to-travel.

As described above, in the embodiment, the disturbance generator 102 is provided in the vehicle behavior calculator 82 included in the closed loop, and the information regarding the behavior of the automobile or the information regarding the travel state to be outputted from the vehicle behavior calculator 82 is changed to that which has changed with the disturbance. This allows the closed loop to carry out the control to cope with the disturbance. Thus, the VDC controller 13 as the verification target is possibly supplied with a significant piece of the vehicle external detection information to cope with the disturbance to be generated under the control to cope with the disturbance.

This makes it possible for the VDC controller 13 to generate the VDC data for the automatic braking and output the VDC data to the braking actuator 23. It is possible for the braking actuator 23 to perform the braking operation for the automatic braking under the control of the VDC controller 13.

In the embodiment, it is possible to evaluate the control of the VDC controller 13 and the operation of the braking actuator 23 in the travel environment in which the disturbance occurs.

Fifth Embodiment

Description is given next of a fifth embodiment of the invention. In the embodiment, the same reference numerals are used for similar configurations to those in the forgoing embodiment, and illustration and description thereof are omitted. Description is mainly given of differences from the forgoing embodiment.

In the embodiment, a case is described in which a disturbance generator 103 to disturb the travel of the automobile is provided in the closed loop of the simulation system 80 in FIG. 6.

FIG. 12 is a block diagram of a simulation system 80 for an automobile, according to the fifth embodiment of the invention.

The simulation system 80 for the automobile in FIG. 12 is realized in the basic configuration in FIG. 5 for the evaluation of the automobile and corresponds to that in FIG. 6.

Moreover, in the simulation system 80 for the automobile in FIG. 12 the disturbance generator 103 is provided for the camera image generator 36 included in the closed loop. It is to be noted that the disturbance generator 103 may be provided in the monitor image generator 35 in FIG. 5.

The camera image generator 36 generates the parallax image viewed from the automobile after the behavior, based on the information regarding the behavior of the automobile or the information regarding the travel state generated by the vehicle behavior calculator 82.

In the camera image generator 36, the disturbance generator 103 adds the disturbance component for the image to the monitor image to be inputted to the camera image generator 36 or the parallax image to be outputted from the camera image generator 36. The camera image generator 36 outputs the parallax image to which the disturbance component is added by the disturbance generator 103.

Here, the disturbance component for the image may be, for example, an obstacle-to-travel such as a preceding vehicle or a pedestrian, a traffic signal, a railroad crossing, or the like.

Moreover, the camera image generator 36 outputs the parallax image including the image component related to the disturbance component, to the compound-eye monitor-for-camera 37.

Thus, in the parallax image displayed by the compound-eye monitor-for-camera 37, the disturbance to disturb the travel of the automobile occurs. The closed loop including the camera image generator 36 carries out the loop control to cope with the occurrence of the disturbance.

The VDC controller 13 carries out the control for the automatic braking and outputs the VDC data to the braking actuator 23. This makes it possible for the automobile traveling in the virtual space to decelerate in the virtual space and eventually stop, by the automatic braking.

The meter controller 14 outputs the alert to the meter panel 24, and outputs the alert sound from the speaker 25. This makes it possible for the occupant of the automobile to recognize the obstacle-to-travel.

As described above, in the embodiment, the disturbance generator 103 is provided in the camera image generator 36 included in the closed loop, and generates the disturbance in the parallax image to be outputted from the camera image generator 36. This allows the closed loop to carry out the control to cope with the disturbance. Moreover, the VDC controller 13 as the verification target is possibly supplied with the significant piece of the vehicle external detection information to cope with the disturbance generated under the control to cope with the disturbance.

This makes it possible for the VDC controller 13 to generate the VDC data for the automatic braking and output the VDC data to the braking actuator 23. It is possible for the braking actuator 23 to perform the braking operation for the automatic braking under the control of the VDC controller 13.

In the embodiment, it is possible to evaluate the control of the VDC controller 13 and the operation of the braking actuator 23 in the travel environment in which the disturbance occurs.

Sixth Embodiment

Description is given next of a sixth embodiment of the invention. In the embodiment, the same reference numerals are used for similar configurations to those in the forgoing embodiment, and illustration and description thereof are omitted. Description is mainly given of differences from the forgoing embodiment.

In the embodiment, the simulation system 80 in FIG. 6 is realized in a different configuration than the basic simulation system 60 in FIG. 5.

FIG. 13 is an illustrative diagram of a basic configuration of a simulation system 300 for an automobile, according to the sixth embodiment of the invention. The simulation system 300 in FIG. 13 is an improvement on the simulation system 30 in FIG. 3.

In FIG. 13, to a synchronous relay device 330, the main communication network 32, a first main in-vehicle network 310, and a second main in-vehicle network 311 are coupled. The first main in-vehicle network 310 may be the in-vehicle network 16 itself of the automobile. The second main in-vehicle network 311 may be the in-vehicle network 16 itself of the automobile. To the synchronous relay device 330, a plurality of the in-vehicle networks 16 of the automobile may be coupled.

Moreover, in the control system 10 of the automobile, to the second main in-vehicle network 311, the vehicle external detection controller 12 is coupled. The vehicle external detection controller 12 outputs the vehicle external detection information to the VDC controller 13 as the verification target.

In contrast, to the first main in-vehicle network 310, the devices of the control system 10 of the automobile are coupled that are not coupled to the second main in-vehicle network 311. In FIG. 13, to the first main in-vehicle network 310, the operation controller 11, the meter controller 14, and the VDC controller 13 are coupled.

As described, the devices of the control system 10 of the automobile are separately coupled to the first main in-vehicle network 310 and the second main in-vehicle network 311.

Moreover, a behavior calculator 630 coupled to the main communication network 32 carries out the calculation of the behavior of the automobile, the calculation of the wheel speeds, VDC simulation, and vehicle external detection simulation.

Thus, the behavior calculator 630 serves as, for example, the vehicle behavior calculator 82, the wheel speed calculator 83, the VDC operation representer 81, and a part of the vehicle external detection controller 123 in FIG. 6.

Moreover, the synchronous relay device 330 carries out routing processing to realize the simulation system 80 in FIG. 6 on the simulation system 300 in FIG. 13.

That is, the synchronous relay device 330 relays the vehicle external detection information outputted by the vehicle external detection controller 12 to the second main in-vehicle network 311, to the main communication network 32 without relaying the vehicle external detection information to the first main in-vehicle network 310. This makes it possible for the behavior calculator 630 to perform the calculation to represent the VDC operation based on the vehicle external detection information generated by the vehicle external detection controller 12, calculate the behavior of the automobile, and output the information regarding the behavior of the automobile to the monitor image generator 35. Thus, the control operation of the closed loop of the simulation system 80 in FIG. 6 is realized.

Moreover, the behavior calculator 630 further calculates the wheel speeds, carries out the similar processing to the vehicle external detection controller 12, and outputs the wheel speeds and the vehicle external detection information to the main communication network 32. The synchronous relay device 330 relays these pieces of the information outputted by the behavior calculator 630 to the main communication network 32, to the first main in-vehicle network 310 without relaying these pieces of the information to the second main in-vehicle network 311. Thus, the VDC controller 13 coupled to the second main in-vehicle network 311 is supplied with the vehicle external detection information and the wheel speeds generated by the behavior calculator 630 as a part of the vehicle external detection controller 123. Furthermore, because the vehicle external detection information outputted by the vehicle external detection controller 12 to the second main in-vehicle network 311 is not relayed to the second main in-vehicle network 311, there is no competition between multiple pieces of the vehicle external detection information in the time slots in the second main in-vehicle network 311.

As described, in the embodiment, it is possible to realize the simulation system 80 in FIG. 6 in the different configuration from the simulation system 60 in FIG. 5.

The forgoing embodiments are examples of preferred embodiments of the invention, but the invention is by no means limited thereto. Various modifications and alterations may be made without departing from the scope of the invention.

DESCRIPTION OF REFERENCE NUMERALS

10 Control system of automobile (control system of vehicle)
11 Operation controller
12 Vehicle external detection controller
13 VDC controller (travel controller)
14 Meter controller
15 Detection controller
16 In-vehicle network
21 Operation member
22 Compound-eye vehicle external camera (imaging member)
23 Braking actuator (actuator)
24 Meter panel
25 Speaker
26 Wheel speed sensor
27 Acceleration rate sensor
28 Speed sensor
31 Main in-vehicle network
32 Main communication network
33 Synchronous relay device
39 Event generator
40 Travel environment generator
34 Behavior calculator
35 Monitor image generator
38 Monitor-for-driver
36 Camera image generator (vehicle external image generator)

37 Compound-eye monitor-for-camera (display member)
60, 80, and 300 Simulation system
61 First synchronous relay device (main synchronous relay device)
63 First behavior calculator (main behavior calculator)
64 Sub-in-vehicle network
65 Sub-communication network
66 Second synchronous relay device (sub-synchronous relay device)
67 Second behavior calculator (sub-behavior calculator)
69 Direct line
70 First inter-device relay
71 Second inter-device relay
81 VDC operation representer (control operation representer)
82 Vehicle behavior calculator
83 Wheel speed calculator
90 Device verifier (detector)
91 Evaluation UI device
92 Evaluation camera
100, 101, 102, and 103 Disturbance generator
121 First vehicle external detection controller
122 Second vehicle external detection controller
601 Main simulator
602 Sub-simulator
630 Behavior calculator
310 First main in-vehicle network
311 Second main in-vehicle network
330 Synchronous relay device

The invention claimed is:

1. A simulation system for a vehicle to allow a vehicle external detection controller and a travel controller to operate, the vehicle external detection controller being configured to output vehicle external detection information based on a captured vehicle external image, and the travel controller being configured to control operation of an actuator for a travel control of the vehicle in accordance with the vehicle external detection information, the simulation system comprising:

a control operation representer configured to acquire the vehicle external detection information outputted by the vehicle external detection controller and represent a control output of the travel controller or an operation output of the actuator in accordance with the vehicle external detection information;

a vehicle behavior calculator configured to calculate behavior of the vehicle by using an output of the control operation representer;

a vehicle external image generator configured to generate a vehicle external image in a travel state of the vehicle variable with the operation of the actuator, by using a calculation result of the vehicle behavior calculator;

a display member configured to display the vehicle external image generated by the vehicle external image generator; and an imaging member configured to capture the vehicle external image displayed by the display member and output a captured vehicle external image to the vehicle external detection controller, wherein the vehicle external detection controller is configured to operate under the travel state of the vehicle generated by a closed loop including the control operation representer, the vehicle behavior calculator, the vehicle external image generator, the display member, and the imaging member, and the travel controller is configured to operate in accordance with the vehicle external detection information generated by the vehicle external detection controller operating in the closed loop or information equivalent to the vehicle external detection information generated by the vehicle external detection controller.

2. The simulation system for the vehicle according to claim 1, further comprising:

a main synchronous relay device to which a main in-vehicle network to which the vehicle external detection controller is coupled and a main communication network to which the vehicle external image generator is coupled are coupled, the main synchronous relay device being configured to relay information between the main in-vehicle network and the main communication network; and a main behavior calculator that is coupled to the main communication network and configured to acquire the vehicle external detection information outputted to the main in-vehicle network by the vehicle external detection controller, to carry out calculation processing, wherein the main behavior calculator is configured to serve as the control operation representer configured to represent the control output of the travel controller or the operation output of the actuator in accordance with the vehicle external detection information outputted by the vehicle external detection controller, and the vehicle behavior calculator configured to calculate the behavior of the vehicle by using the output of the control operation representer, and output the calculation result of the vehicle behavior calculator to the vehicle external image generator through the main communication network.

3. The simulation system for the vehicle according to claim 2, comprising:

a sub-synchronous relay device to which a sub-in-vehicle network to which the travel controller is coupled and a sub-communication network are coupled, the sub-synchronous relay device being configured to relay information between the sub-in-vehicle network and the sub-communication network; and a sub-behavior calculator that is coupled to the sub-communication network and configured to carry out calculation processing, wherein the sub-synchronous relay device is communicatably coupled to the main synchronous relay device, the main synchronous relay device is configured to output, to the sub-synchronous relay device, information acquirable from the main in-vehicle network or the main communication network, the sub-behavior calculator is configured to serve as a travel information calculator configured to acquire, through the sub-communication network, information indicating the behavior of the vehicle calculated by the main behavior calculator, or the travel state of the vehicle in accordance with the behavior, and calculate information to be inputted to the travel controller in accordance with the information acquired, and output a calculation result of the travel information calculator to the sub-communication network, the sub-synchronous relay device is configured to output the calculation result of the travel information calculator to be outputted to the sub-communication network, to the travel controller through the sub-in-vehicle network.

4. The simulation system for the vehicle according to claim 3, further comprising a detector configured to detect the operation of the actuator the operation of which is controlled by the travel controller.

5. The simulation system for the vehicle according to claim 2, wherein in the closed loop, a disturbance generator configured to disturb travel of the vehicle is further provided.

6. The simulation system for the vehicle according to claim 5, wherein the disturbance generator generates a disturbance to disturb the travel of the vehicle by changing the output of the control operation representer.

7. The simulation system for the vehicle according to claim 5, wherein the disturbance generator is provided in the vehicle external image generator and configured to generate, in an image to be displayed by the display member, a disturbance to disturb the travel of the vehicle, by adding a disturbance component to the vehicle external image in the travel state of the vehicle to be generated by the vehicle external image generator.

8. The simulation system for the vehicle according to claim 5, wherein the disturbance generator is provided in the imaging member, and configured to generate, in the captured vehicle external image to be outputted by the imaging member, a disturbance to disturb the travel of the vehicle, by adding a disturbance component to the captured vehicle external image to be outputted by the imaging member.

9. The simulation system for the vehicle according to claim 5, wherein the disturbance generator is provided in the vehicle external detection controller, and configured to generate a disturbance to disturb the travel of the vehicle by changing the vehicle external detection information to be outputted by the vehicle external detection controller.

10. The simulation system for the vehicle according to claim 1, wherein in the closed loop, a disturbance generator configured to disturb travel of the vehicle is further provided.

11. The simulation system for the vehicle according to claim 10, wherein the disturbance generator generates a disturbance to disturb the travel of the vehicle by changing the output of the control operation representer.

12. The simulation system for the vehicle according to claim 10, wherein the disturbance generator is provided in the vehicle external image generator and configured to generate, in an image to be displayed by the display member, a disturbance to disturb the travel of the vehicle, by adding a disturbance component to the vehicle external image in the travel state of the vehicle to be generated by the vehicle external image generator.

13. The simulation system for the vehicle according to claim 10, wherein the disturbance generator is provided in the imaging member, and configured to generate, in the captured vehicle external image to be outputted by the imaging member, a disturbance to disturb the travel of the vehicle, by adding a disturbance component to the captured vehicle external image to be outputted by the imaging member.

14. The simulation system for the vehicle according to claim 10, wherein the disturbance generator is provided in the vehicle external detection controller, and configured to generate a disturbance to disturb the travel of the vehicle by changing the vehicle external detection information to be outputted by the vehicle external detection controller.

15. A simulation system for a vehicle to allow a vehicle external detection controller and a travel controller to operate, the vehicle external detection controller being configured to output vehicle external detection information based on a captured vehicle external image, and the travel controller being configured to control operation of an actuator for a travel control of the vehicle in accordance with the vehicle external detection information, the simulation system comprising:

one or more processors configured to acquire the vehicle external detection information outputted by the vehicle external detection controller and represent a control output of the travel controller or an operation output of the actuator in accordance with the vehicle external detection information, calculate behavior of the vehicle by using the control output or the operation output, and generate a vehicle external image in a travel state of the vehicle variable with the operation of the actuator, by using the calculated behavior of the vehicle;

a display member including a monitor and configured to display the vehicle external image generated by the vehicle external image generator; and an imaging member including a camera and configured to capture the vehicle external image displayed by the display member and output a captured vehicle external image to the vehicle external detection controller, wherein the vehicle external detection controller is configured to operate under the travel state of the vehicle generated by a closed loop including the one or more processors, the vehicle external image generator, the display member, and the imaging member, and the travel controller is configured to operate in accordance with the vehicle external detection information generated by the vehicle external detection controller operating in the closed loop or information equivalent to the vehicle external detection information generated by the vehicle external detection controller.

* * * * *